United States Patent
Sugiyama

(10) Patent No.: US 10,404,101 B2
(45) Date of Patent: Sep. 3, 2019

(54) CONTACTLESS ELECTRIC POWER TRANSMISSION DEVICE AND ELECTRIC POWER TRANSFER SYSTEM

(71) Applicant: TOYOTA JIDOSHA KABUSHIKI KAISHA, Toyota-shi, Aichi-ken (JP)

(72) Inventor: Yoshinobu Sugiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 15/383,280

(22) Filed: Dec. 19, 2016

(65) Prior Publication Data
US 2017/0187243 A1  Jun. 29, 2017

(30) Foreign Application Priority Data
Dec. 24, 2015  (JP) .................. 2015-251780

(51) Int. Cl.
*H02J 50/12* (2016.01)
*B60L 53/12* (2019.01)
(Continued)

(52) U.S. Cl.
CPC .............. *H02J 50/12* (2016.02); *B60L 53/12* (2019.02); *H02J 7/025* (2013.01); *H02J 7/047* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ......... B60L 11/182; H02J 7/025; H02J 7/047; H02J 7/10; H02J 7/00; H02M 7/48
See application file for complete search history.

(56) References Cited

U.S. PATENT DOCUMENTS

2009/0140691 A1* 6/2009 Jung .................. H02J 7/0027
                                                          320/108
2012/0286724 A1  11/2012 Tsai et al.
(Continued)

FOREIGN PATENT DOCUMENTS

EP    2 471 682 A1    7/2012
EP    2 897 253 A1    7/2015
(Continued)

*Primary Examiner* — Jared Fureman
*Assistant Examiner* — Emmanuel Dominique
(74) *Attorney, Agent, or Firm* — Oliff PLC

(57) ABSTRACT

A contactless electric power transmission device includes a power transmission assembly, a first temperature sensor, a second temperature sensor, and an electronic control unit. The first temperature sensor is configured to detect a temperature of an inverter. The second temperature sensor is configured to detect a temperature of a resonance circuit. The electronic control unit is configured to adjust the frequency by controlling the inverter. The electronic control unit is configured to perform first control when the temperature of the inverter is higher than the temperature of the resonance circuit, and perform second control when the temperature of the resonance circuit is higher than the temperature of the inverter. The first control includes control for adjusting the frequency so as to reduce output current of the inverter. The second control includes control for adjusting the frequency so as to reduce current flowing through the resonance circuit.

5 Claims, 14 Drawing Sheets

(51) Int. Cl.
*H02J 7/02* (2016.01)
*H02J 7/04* (2006.01)

(56) References Cited

U.S. PATENT DOCUMENTS

| | | |
|---|---|---|
| 2013/0106348 A1 | 5/2013 | Jung |
| 2013/0127409 A1 | 5/2013 | Ichikawa |
| 2013/0193749 A1 | 8/2013 | Nakamura et al. |
| 2015/0008877 A1 | 1/2015 | Ichikawa et al. |
| 2015/0372502 A1* | 12/2015 | Murayama .............. H02J 7/025 307/104 |

FOREIGN PATENT DOCUMENTS

| | | |
|---|---|---|
| JP | 2013-055856 A | 3/2013 |
| JP | 2013-110822 A | 6/2013 |
| JP | 2013-126327 A | 6/2013 |
| JP | 2013-135572 A | 7/2013 |
| JP | 2013-146148 A | 7/2013 |
| JP | 2013-146154 A | 7/2013 |
| JP | 2013-154815 A | 8/2013 |
| KR | 10-2011-0065969 A | 6/2011 |
| KR | 10-2013-0048404 A | 5/2013 |

\* cited by examiner

CONTACTLESS ELECTRIC POWER TRANSMISSION DEVICE AND ELECTRIC POWER TRANSFER SYSTEM

INCORPORATION BY REFERENCE

The disclosure of Japanese Patent Application No. 2015-251780 filed on Dec. 24, 2015 including the specification, drawings and abstract is incorporated herein by reference in its entirety.

BACKGROUND

1. Technical Field

The present disclosure relates to a contactless electric power transmission device and an electric power transfer system, and in particular to an electric power transmission device that contactlessly transmits electric power to an electric power receiving device, and an electric power transfer system including the electric power transmission device.

2. Description of Related Art

An electric power transfer system that contactlessly or wirelessly transfers electric power from an electric power transmission device to an electric power receiving device is known (see, for example, Japanese Patent Application Publications Nos. 2013-154815 (JP 2013-154815 A), 2013-146154 (JP 2013-146154 A), 2013-146148 (JP 2013-146148 A), 2013-110822 (JP 2013-110822 A), 2013-126327 (JP 2013-126327 A), and 2013-135572 (JP 2013-135572 A)). In JP 2013-154815 A, for example, an electric power transfer system that contactlessly transmits electric power from a power transmission unit of an electric power transmission device provided outside a vehicle, to a power receiving unit provided in the vehicle, is disclosed (see JP 2013-154815 A).

SUMMARY

A power-supply-integrated power transmission assembly that includes an inverter, and a resonance circuit that receives alternate current (AC) power produced by the inverter and contactlessly transmits the power to an electric power receiving device, has been studied. The power transmission assembly has a sealed structure for the sake of water prevention, dust prevention, etc., and heat is likely to be accumulated in the inside of the assembly. In the power-supply-integrated power transmission assembly as described above, heat generated by the inverter, as well as heat generated by the resonance circuit, is large, and the temperature of the inverter, as well as that of the resonance circuit, needs to be appropriately managed.

When a filter circuit is provided between the inverter and the resonance circuit, a difference may appear between the magnitude of current flowing through the inverter (the magnitude of output current of the inverter), and the magnitude of current flowing through the resonance circuit, and heat may be unevenly generated by a greater amount in one of the inverter and the resonance circuit. If heat is unevenly generated by a greater amount in one of the inverter and the resonance circuit, transmission power is limited due to temperature restrictions imposed when the temperature of the one generating a greater amount of heat rises, for example, and various problems, such as a failure to transmit desired electric power from the power transmission device to the power receiving device, occur.

The present disclosure provides a contactless electric power transmission device provided with a power transmission assembly including an inverter and a resonance circuit that contactlessly transmits electric power to an electric power receiving device, and an electric power transfer system, wherein heat is less likely or unlikely to be unevenly generated by a greater amount in one of the resonance circuit and the inverter.

A contactless electric power transmission device according to a first aspect of the present disclosure includes a power transmission assembly, a first temperature sensor, a second temperature sensor, and an electronic control unit. The power transmission assembly includes an inverter, a filter circuit, and a resonance circuit. The inverter is configured to produce alternate current power having a given frequency. The resonance circuit is configured to receive the alternate current power from the inverter via the filter circuit, and contactlessly transmit the alternate current power to an electric power receiving device. The first temperature sensor is configured to detect a temperature of the inverter. The second temperature sensor is configured to detect a temperature of the resonance circuit. The electronic control unit is configured to adjust the frequency of the alternate current power by controlling the inverter. The electronic control unit is configured to perform first control when the temperature of the inverter is higher than the temperature of the resonance circuit, and perform second control when the temperature of the resonance circuit is higher than the temperature of the inverter. The first control includes control for adjusting the frequency so as to reduce output current of the inverter. The second control includes control for adjusting the frequency so as to reduce current flowing through the resonance circuit.

In the contactless electric power transmission device according to the above aspect of the present disclosure, when the temperature of the inverter is higher than that of the resonance circuit, the temperature of the inverter is lowered, through the first control for adjusting the frequency so as to reduce output current of the inverter. On the other hand, when the temperature of the resonance circuit is higher than that of the inverter, the temperature of the resonance circuit is lowered, through the second control for adjusting the frequency so as to reduce the current flowing through the resonance circuit. Accordingly, heat is less likely or unlikely to be unevenly generated by a greater amount in one of the resonance circuit and the inverter.

In the contactless electric power transmission device according to the above aspect of the present disclosure, the electronic control unit may be configured to perform the first control, when the temperature of the inverter is higher than the temperature of the resonance circuit, and the temperature of the inverter exceeds a first threshold temperature. The electronic control unit may be configured to perform the second control, when the temperature of the resonance circuit is higher than the temperature of the inverter, and the temperature of the resonance circuit exceeds a second threshold temperature.

According to the contactless electric power transmission device as described above, when the temperature of the inverter is higher than that of the resonance circuit, the frequency is adjusted when the temperature of the inverter exceeds the first threshold temperature. Also, when the temperature of the resonance circuit is higher than that of the inverter, the frequency is adjusted when the temperature of the resonance circuit exceeds the second threshold temperature. Accordingly, the frequency is prevented from being adjusted even when it is not necessary to lower the temperature of the inverter or the resonance circuit.

In the contactless electric power transmission device according to the above aspect of the present disclosure, the electronic control unit may be configured to perform the first control, when the temperature of the inverter is higher than the temperature of the resonance circuit, and a difference between the temperature of the inverter and the temperature of the resonance circuit is larger than a first threshold value. The electronic control unit may be configured to perform the second control, when the temperature of the resonance circuit is higher than the temperature of the inverter, and a difference between the temperature of the resonance circuit and the temperature of the inverter is larger than a second threshold value.

According to the contactless electric power transmission device as described above, when the temperature of the inverter is higher than that of the resonance circuit, the frequency is adjusted when the difference between the temperature of the inverter and that of the resonance circuit is larger than the first threshold value. Also, when the temperature of the resonance circuit is higher than that of the inverter, the frequency is adjusted when the difference between the temperature of the resonance circuit and that of the inverter is larger than the second threshold value. Accordingly, the frequency is prevented from being adjusted even when the difference in temperature between the inverter and the resonance circuit is small.

In the contactless electric power transmission device according to the above aspect of the present disclosure, the first control may include continuously varying the frequency over an adjustable range of the frequency, and adjusting the frequency to a frequency at which the output current of the inverter is smallest in the adjustable range. The second control may include continuously varying the frequency over the adjustable range of the frequency, and adjusting the frequency to a frequency at which the current flowing through the resonance circuit is smallest in the adjustable range.

According to the contactless electric power transmission device as described above, heat generated in one of the resonance circuit and the inverter having the higher temperature can be promptly suppressed or reduced, and uneven distribution of generated heat between the resonance circuit and the inverter can be promptly curbed.

An electric power transfer system according to a second aspect of the present disclosure includes an electric power transmission device, and an electric power receiving device configured to contactlessly receive electric power from the electric power transmission device. The electric power transmission device includes a power transmission assembly, a first temperature sensor, a second temperature sensor, and an electronic control unit. The power transmission assembly includes an inverter, a filter circuit, and a resonance circuit. The inverter is configured to produce alternate current power having a given frequency. The resonance circuit is configured to receive the alternate current power from the inverter via the filter circuit, and contactlessly transmit the alternate current power to the electric power receiving device. The first temperature sensor is configured to detect a temperature of the inverter. The second temperature sensor is configured to detect a temperature of the resonance circuit. The electronic control unit is configured to adjust the frequency of the alternate current power by controlling the inverter. The electronic control unit is configured to perform first control when the temperature of the inverter is higher than the temperature of the resonance circuit, and perform second control when the temperature of the resonance circuit is higher than the temperature of the inverter. The first control includes control for adjusting the frequency so as to reduce output current of the inverter. The second control includes control for adjusting the frequency so as to reduce current flowing through the resonance circuit.

In the electric power transfer system according to the second aspect of the present disclosure, when the temperature of the inverter is higher than that of the resonance circuit, the temperature of the inverter is lowered, through the first control for adjusting the frequency so as to reduce output current of the inverter. On the other hand, when the temperature of the resonance circuit is higher than that of the inverter, the temperature of the resonance circuit is lowered, through the second control for adjusting the frequency so as to reduce the current flowing through the resonance circuit. Accordingly, heat is less likely or unlikely to be unevenly generated by a greater amount in one of the resonance circuit and the inverter.

According to the present disclosure, in the contactless electric power transmission device provided with the power transmission assembly including the inverter and the resonance circuit that contactlessly transmits electric power to the electric power receiving device, and the electric power transfer system, heat is less likely or unlikely to be unevenly generated by a greater amount in one of the resonance circuit and the inverter.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
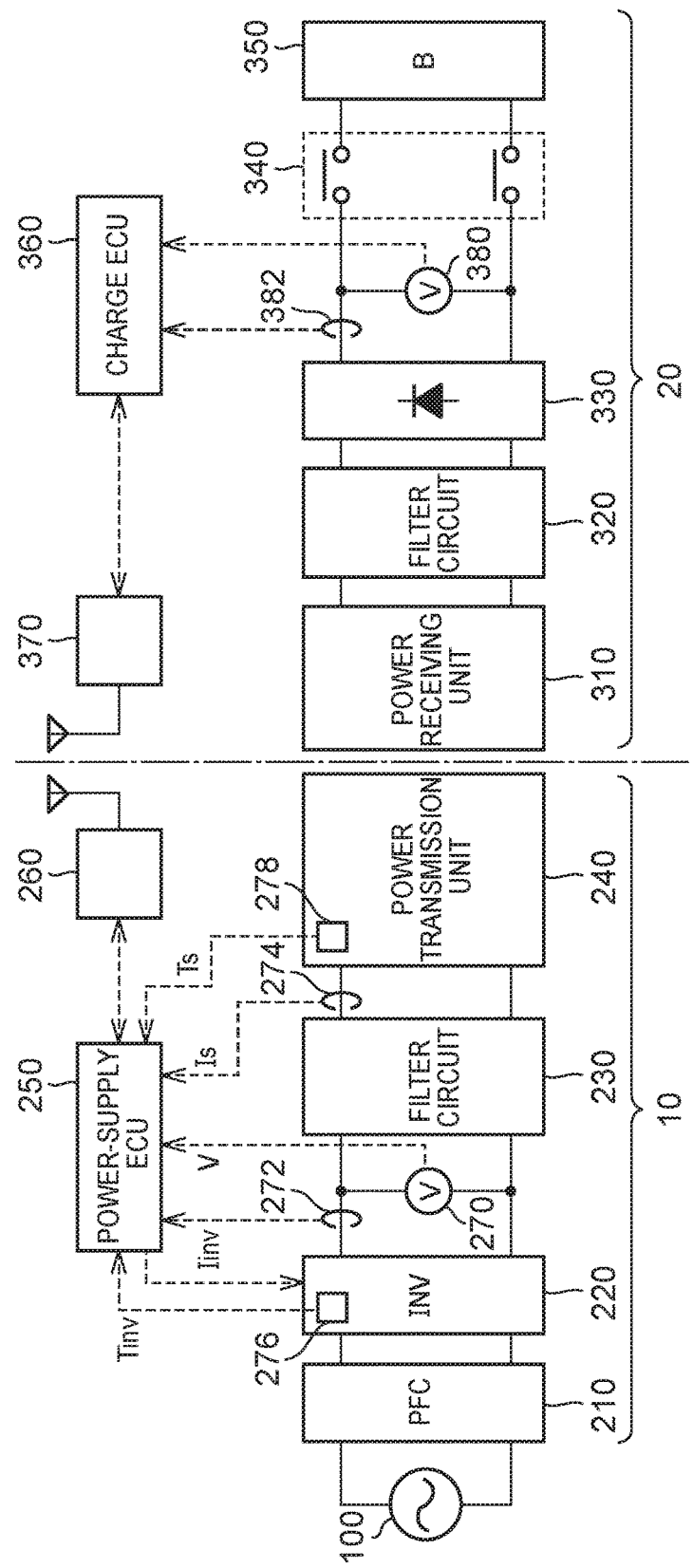
FIG. 1 is a view showing the overall configuration of an electric power transfer system in which a contactless electric power transmission device according to a first embodiment of the present disclosure is used.

Some embodiments of the present disclosure will be described in detail with reference to the drawings. In the drawings, the same reference numerals are assigned to the same or corresponding portions or components, of which explanation will not be repeated.

FIG. 1 shows the overall configuration of an electric power transfer system in which a contactless electric power transmission device according to a first embodiment of the present disclosure is used. Referring to FIG. 1, the electric power transfer system includes an electric power transmission device 10 and an electric power receiving device 20. For example, the power receiving device 20 may be installed on a vehicle, or the like, which is able to travel using electric power supplied from the power transmission device 10 and stored.

The electric power transmission device 10 includes a power factor correction (PFC) circuit 210, inverter 220, filter circuit 230, and a power transmission unit 240. The power transmission device 10 further includes a power-supply electronic control unit (which will be called "power-supply ECU") 250, communication unit 260, voltage sensor 270, current sensors 272, 274, and temperature sensors 276, 278.

The PFC circuit 210 rectifies electric power received from an alternate current (AC) power supply 100, such as a commercial system power supply, raises its voltage, and supplies the resulting power to the inverter 220, and is also able to correct the power factor by making input current approximate to a sine wave. Various known PFC circuits may be employed as the PFC circuit 210. A rectifier that does not have a power factor correcting function may also be employed, in place of the PFC circuit 210.

The inverter 220 converts direct current (DC) power received from the PFC circuit 210, into alternate current (AC) transmission power having a given frequency (e.g., several dozens of kHz), according to a control signal from the power-supply ECU 250. The inverter 220 is able to change the frequency of the transmission power as desired, by changing the switching frequency according to a control signal from the power-supply ECU 250. The transmission power produced by the inverter 220 is supplied to the power transmission unit 240, via the filter circuit 230. The inverter 220 is in the form of a single-phase full-bridge circuit, for example.

The filter circuit 230, which is provided between the inverter 220 and the power transmission unit 240, suppresses or reduces higher harmonic noise generated from the inverter 220. For example, the filter circuit 230 is in the form of an LC filter including an inductor and a capacitor.

The power transmission unit 240 receives alternate current (AC) power (transmission power) produced by the inverter 220 from the inverter 220, via the filter circuit 230, and contactlessly transmits the power to a power receiving unit 310 of the power receiving device 20, via a magnetic field produced around the power transmission unit 240. The power transmission unit 240 includes a resonance circuit (not shown) for contactlessly transmitting power to the power receiving unit 310. While the resonance circuit can be constituted by a coil and a capacitor, the capacitor may not be provided if a desired resonant condition is formed by the coil alone.

The voltage sensor 270 detects the output voltage V of the inverter 220, and outputs its detected value to the power-supply ECU 250. The current sensor 272 detects current flowing through the inverter 220, i.e., output current Iinv of the inverter 220, and outputs its detected value to the power-supply ECU 250. On the basis of the detected values of the voltage sensor 270 and the current sensor 272, the transmission power supplied from the inverter 220 to the power transmission unit 240 can be detected.

The current sensor 274 detects current Is flowing through the resonance circuit of the power transmission unit 240, and outputs its detected value to the power-supply ECU 250. The temperature sensor 276 detects the temperature Tinv of the inverter 220, and outputs its detected value to the power-supply ECU 250. The temperature sensor 278 detects the temperature Ts of the resonance circuit of the power transmission unit 240, and outputs its detected value to the power-supply ECU 250.

The power-supply ECU 250, which includes a CPU (Central Processing Unit), storage device, input/output buffer (all of which are not shown), etc., receives signals from the above-indicated sensors, etc., and controls various devices in the power transmission device 10. For example, the power-supply ECU 250 performs switching control of the inverter 220, so that the inverter 220 produces transmission power having a given frequency, when electric power is transferred from the power transmission device 10 to the power receiving device 20. Various controls mentioned herein are not limited to processing by software, but may be performed with exclusive hardware (electronic circuits).

In the power transmission device 10 according to the first embodiment, the power-supply ECU 250 performs control (which will also be called "transmission power control") for making the transmission power equal to a target power, during electric power transfer from the power transmission device 10 to the power receiving device 20, as main control performed by the power-supply ECU 250. More specifically, the power-supply ECU 250 adjusts the duty of the output voltage of the inverter 22, thereby to control the transmission power to the target power.

Further, the power-supply ECU 250 performs control (which will also be called "temperature difference reduction control") for reducing a temperature difference between the inverter 220 and the resonance circuit of the power transmission unit 240, as well as the above-described transmission power control. More specifically, the power-supply ECU 250 adjusts the frequency of the AC transmission power by changing the switching frequency of the inverter 220, so as to reduce current that flows through one of the inverter 220 and the resonance circuit of the power transmission unit 240, which one has the higher temperature. The transmission power control and the temperature difference reduction control will be described in detail later.

The communication unit 260 is configured to wirelessly communicate with a communication unit 370 of the power receiving device 20. The communication unit 260 receives a target value (target power) of the transmission power transmitted from the power receiving device 20, transmits and receives information concerning start/stop of electric power transfer, to and from the power receiving device 20, and receives power receiving conditions (received voltage, received current, received power, etc.) of the power receiving device 20 from the power receiving device 20.

On the other hand, the power receiving device 20 includes the power receiving unit 310, filter circuit 320, rectifying unit 330, relay circuit 340, and a power storage device 350. The power receiving device 20 further includes a charge ECU 360, communication unit 370, voltage sensor 380, and a current sensor 382.

The power receiving unit 310 contactlessly receives alternate current (AC) electric power delivered from the power transmission unit 240 of the power transmission device 10, through a magnetic field. For example, the power receiving unit 310 includes a resonance circuit (not shown) for contactlessly receiving electric power from the power transmission unit 240. While the resonance circuit can be constituted by a coil and a capacitor, the capacitor may not be provided if a desired resonant condition is formed by the coil alone.

The filter circuit 320, which is provided between the power receiving unit 310 and the rectifying unit 330, suppresses or reduces higher harmonic noise generated when the power receiving unit 310 receives electric power. For example, the filter circuit 320 is in the form of an LC filter including an inductor and a capacitor. The rectifying unit 330 rectifies alternate current (AC) power received by the power receiving unit 310, and delivers the resulting power to the power storage device 350. The rectifying unit 330 includes a smoothing capacitor as well as a rectifier.

The power storage device 350 is a rechargeable direct current (DC) power supply, and includes a secondary battery, such as a lithium-ion battery or a nickel-metal-hydride battery. The power storage device 350 stores electric power delivered from the rectifying unit 330. Then, the power storage device 350 supplies the stored power to a load drive unit, etc. (not shown). An electric double layer capacitor, or the like, may also be employed as the power storage device 350.

The relay circuit 340 is provided between the rectifying unit 330 and the power storage device 350. The relay circuit 340 is placed in an ON (conduction) state when the power storage device 350 is charged by the power transmission device 10. Although not particularly illustrated, a DC/DC converter that adjusts the output voltage of the rectifying unit 330 may be provided between the rectifying unit 330 and the power storage device 350 (e.g., between the rectifying unit 330 and the relay circuit 340).

The voltage sensor 380 detects the output voltage (received voltage) of the rectifying unit 330, and outputs its detected value to the charge ECU 360. The current sensor 382 detects the output current (received current) from the rectifying unit 330, and outputs its detected value to the charge ECU 360. The power received by the power receiving unit 310 (which corresponds to the charging power of the power storage device 350) can be detected, based on the detected values of the voltage sensor 380 and the current sensor 382. The voltage sensor 380 and the current sensor 382 may be provided between the power receiving unit 310 and the rectifying unit 330 (e.g., between the filter circuit 320 and the rectifying unit 330).

The charge ECU 360, which includes a CPU, storage device, input/output buffer (all of which are not illustrated), etc., receives signals from the above-indicated sensors, etc., and controls various devices in the power receiving device 20. Various controls mentioned herein are not limited to processing by software, but may be performed with exclusive hardware (electronic circuits).

As main control performed by the charge ECU 360, the charge ECU 360 produces a target value (target power) of transmission power for use in the power transmission device 10, during receiving of power from the power transmission device 10, so that the power received by the power receiving device 20 becomes equal to a desired target value. More specifically, the charge ECU 360 produces the target value of the transmission power for use in the power transmission device 10, based on a deviation or difference between the detected value and target value of the received power. Then, the charge ECU 360 transmits the produced target value (target power) of the transmission power to the power transmission device 10 via the communication unit 370.

The communication unit 370 is configured to wirelessly communicate with the communication unit 260 of the power transmission device 10. The communication unit 370 transmits the target value (target power) of the transmission power produced in the charge ECU 360, to the power transmission device 10, sends and receives information concerning start/stop of electric power transmission to and from the power transmission device 10, and transmits power receiving conditions (received voltage, received current, received power, etc.) of the power receiving device 20, to the power transmission device 10.

In the power transmission device 10 of the electric power transfer system, AC power having a given frequency is supplied from the inverter 220 to the power transmission unit 240 via the filter circuit 230. Each of the power transmission unit 240 and the power receiving unit 310 includes a resonance circuit, and is designed to resonate at the frequency of the AC power.

If AC power is supplied from the inverter 220 to the power transmission unit 240 via the filter circuit 230, energy (electric power) is transferred from the power transmission unit 240 to the power receiving unit 310, via a magnetic field formed between a coil that constitutes the resonance circuit of the power transmission unit 240, and a coil that constitutes the resonance circuit of the power receiving unit 310. The energy (electric power) transferred to the power receiving unit 310 is supplied to the power storage device 350 via the filter circuit 320 and the rectifying unit 330.

Figure 2:
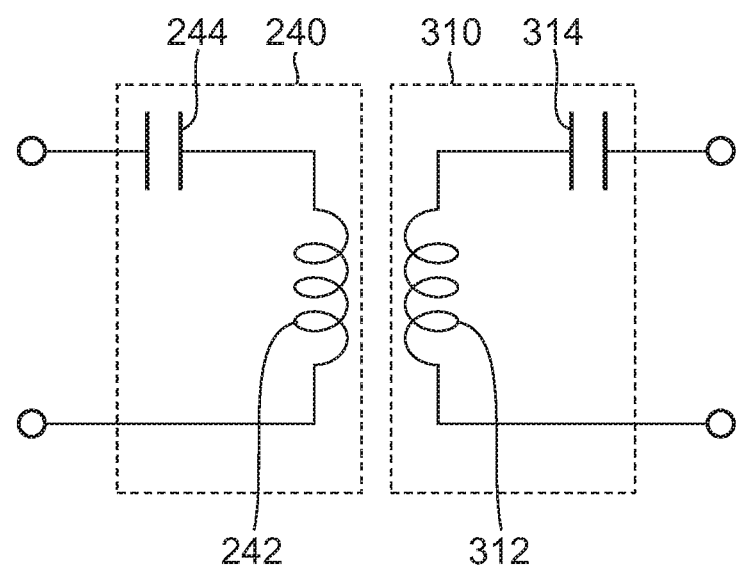
FIG. 2 is a view showing one example of the circuit configuration of power transmission unit and power receiving unit shown in FIG. 1.

FIG. 2 shows one example of the circuit configuration of the power transmission unit 240 and the power receiving unit 310 shown in FIG. 1. Referring to FIG. 2, the power transmission unit 240 includes a coil 242 and a capacitor 244. The capacitor 244 is connected in series with the coil 242, and cooperates with the coil 242 to form the resonance circuit. The capacitor 244 is provided for adjusting the resonance frequency of the power transmission unit 240. The Q value of the resonance circuit constituted by the coil 242 and the capacitor 244 is preferably 100 or larger.

The power receiving unit 310 includes a coil 312 and a capacitor 314. The capacitor 314 is connected in series with the coil 312, and cooperates with the coil 312 to form the resonance circuit. The capacitor 314 is provided for adjusting the resonance frequency of the power receiving unit 310. The Q value indicating the resonance intensity of the resonance circuit constituted by the coil 312 and the capacitor 314 is preferably 100 or larger.

In each of the power transmission unit 240 and the power receiving unit 310, the capacitor may be connected in parallel with the coil. In the case where a desired resonance frequency can be achieved without any capacitor, the resonance circuit may not include the capacitor.

Although not particularly illustrated, the structure of the coil 242, 312 is not particularly limited. For example, when the power transmission unit 240 and the power receiving unit 310 are opposed straight to each other, a coil in a spiral form or a helical form, which is wound around an axis that extends along a direction in which the power transmission unit 240 and the power receiving unit 310 are arranged, may be employed as each of the coils 242, 312. Alternatively, when the power transmission unit 240 and the power receiving unit 310 are opposed straight to each other, a coil formed by winding an electric wire or cable around a ferrite plate that is normal to the direction in which the power transmission unit 240 and the power receiving unit 310 are arranged may be employed as each of the coils 242, 312.

Figure 3:
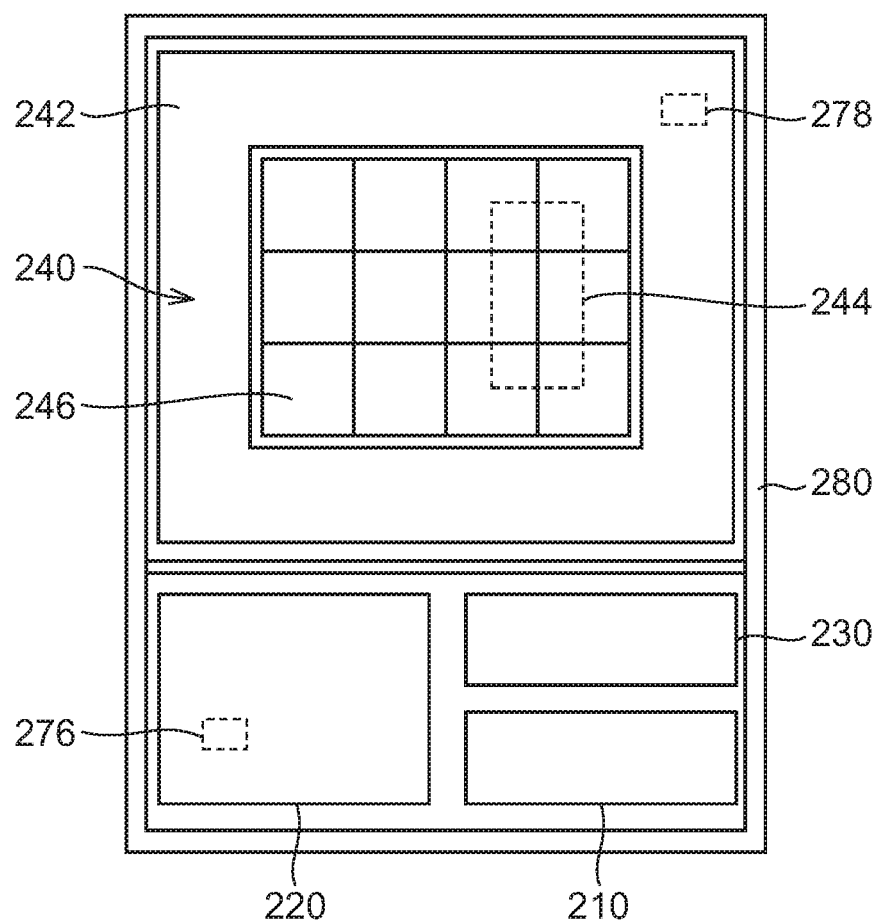
FIG. 3 is a plan view of a power transmission assembly that contactlessly transmits electric power to an electric power receiving device, in the power transmission device.

FIG. 3 is a plan view of a power transmission assembly that contactlessly transmits electric power to the power receiving device 20, in the power transmission device 10. Referring to FIG. 3, the power transmission assembly includes a case 280, and the power transmission unit 240 is housed in the case 280. Although not illustrated in the drawings, the case 280 is actually provided with a cover, for the sake of water prevention, dust prevention, etc., and the power transmission assembly is hermetically sealed or closed by the case 280 and the cover.

Although the structure of the coil 242 of the power transmission unit 240 is not particularly limited as described above, the coil 242 shown in FIG. 3 is located on the upper surface of a ferrite plate including a plurality of ferrite cores 246, and a spiral coil is employed as the coil 242. For example, the capacitor 244 of the power transmission unit 240 is located below the ferrite core 246, via an electromagnetic shield plate (not shown), or the like.

In the power transmission device 10 according to the first embodiment, the inverter 220 is also housed in the case 280. Namely, the power transmission assembly is a power-supply-integrated type power transmission assembly in which the inverter 220 is housed in the case 280 in which the resonance circuit (the coil 242 and the capacitor 244) of the power transmission unit 240 is housed. Heat generated by the inverter 220, as well as that of the resonance circuit of the power transmission unit 240, is large; therefore, in the power-supply-integrated power transmission assembly, it is desired to appropriately manage or control the temperature of the inverter 220 as well as that of the resonance circuit. Thus, in the power transmission device 10, the temperature sensors 276, 278 are provided for measuring the temperatures of the inverter 220 and the resonance circuit, respectively.

The temperature sensors 276, 278 are preferably located at positions where the largest heat is generated in the inverter 220 and the resonance circuit, respectively. For example, the temperature sensor 276 may be located in the vicinity of switching devices (not shown) of the inverter 220, and the temperature sensor 278 may be located on the upper surface of the coil 242.

In the power transmission device 10, the PFC circuit 210 and the filter circuit 230 are also housed in the case 280. While these circuits also generate heat in the power transmission assembly, the heat thus generated is smaller than the heat generated by the inverter 220 that performs high-frequency switching, and the heat generated by the resonance circuit having a large coil winding length. Thus, in the power transmission device 10, the temperatures of the inverter 220 and the resonance circuit which generate large heat are monitored in the power transmission assembly.

Referring again to FIG. 1, in the power transmission device 10 according to the first embodiment, the filter circuit 230 is provided between the power transmission unit 240 and the inverter 220. Therefore, even when the loss of the filter circuit 230 is small, and a difference between electric power delivered from the inverter 220 and electric power supplied to the power transmission unit 240 is small, a difference may arise between the magnitude of current (output current of the inverter 220) flowing through the inverter 220, and the magnitude of current flowing through the resonance circuit of the power transmission unit 240. As a result, uneven distribution of heat generated appears between the inverter 220 and the resonance circuit, due to the above-mentioned current difference, and a temperature difference between the inverter 220 and the resonance circuit may be large in the power transmission assembly. This point will be described in detail.

Figure 4:
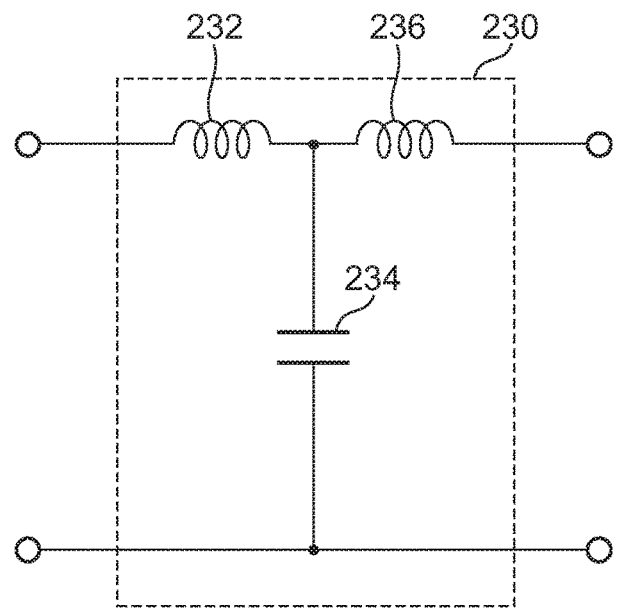
FIG. 4 is a view showing a configuration example of a filter circuit.

FIG. 4 is a view showing a configuration example of the filter circuit 230.

Although not particularly illustrated, the configuration of the filter circuit 320 of the power receiving device 20 is similar to that of the filter circuit 230. Referring to FIG. 4, the filter circuit 230 includes coils 232, 236 and a capacitor 234. The coils 232, 236 are connected in series on one of a pair of power lines between the inverter 220 and the power transmission unit 240, and the capacitor 234 is connected between a connection node of the coils 232, 236 and the other of the above-indicated pair of power lines. Namely, the filter circuit 230 is an L-C-L type third-order LC filter.

Figure 5:
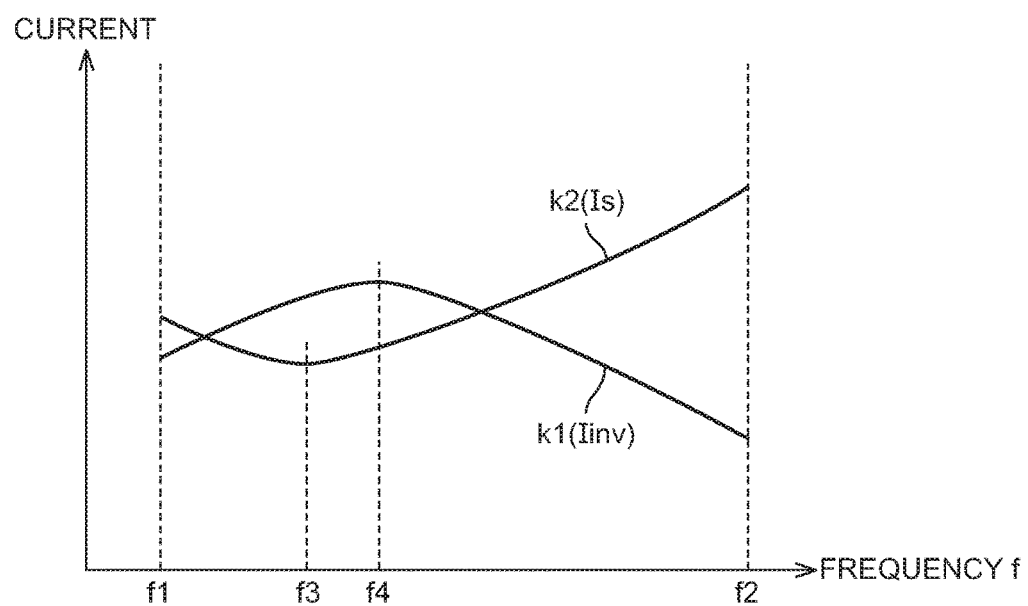
FIG. 5 is a view indicating the frequency dependencies of current of an inverter and current of a power transmission unit under a condition that transmission power is constant, when the filter circuit is in the form of a third-order LC filter as shown in FIG. 4.

FIG. 5 shows the frequency dependence of current Iinv of the inverter 220 and current Is of the power transmission unit 240 under a condition that the transmission power is constant, when the filter circuit 230 is in the form of the third-order LC filter shown in FIG. 4. Referring to FIG. 5, the horizontal axis indicates the frequency f of the transmission power (AC) which is adjusted by changing the switching frequency of the inverter 220. In FIG. 5, frequency f1 indicates the lower limit of an adjustable range of the frequency f, and frequency f2 indicates the upper limit of the adjustable range of the frequency f. The adjustable range of the frequency f is determined in advance in view of the efficiency of electric power transfer between the power transmission unit 240 and the power receiving unit 310, for example.

Under the condition that the transmission power is constant, line k1 indicates the frequency dependence of the magnitude of current Iinv indicating current flowing through the inverter 220, and line k2 indicates the frequency dependence of the magnitude of current Is flowing through the resonance circuit (the coil 242 and the capacitor 244) of the power transmission unit 240. As shown in FIG. 5, in this example, the current Iinv varies along a curve that is convex upward as the frequency changes, and the current Is varies along a curve that is convex downward as the frequency changes, in the adjustable range of the frequency f. In FIG. 5, f3 denotes a frequency at which the magnitude of the current Is is smallest in the adjustable range of the frequency f, and f4 denotes a frequency at which the current Iinv is largest in the adjustable range of the frequency f.

It is understood from the frequency dependences of the magnitudes of the currents Iinv, Is that, even under the condition that the transmission power is constant, the magnitude of the current Iinv can be reduced, or the magnitude of the current Is can be reduced, by adjusting the frequency f of the transmission power. For example, when the temperature Ts of the resonance circuit of the power transmission unit 240 is higher than the temperature Tinv of the inverter 220, in the case where the frequency f is adjusted to the frequency f2, the magnitude of the current Is flowing through the resonance circuit of the power transmission unit 240 can be reduced without reducing the transmission power, by adjusting the frequency f to the frequency f3, for example. As a result, the temperature Ts of the resonance circuit of the power transmission unit 240 can be lowered.

Where the filter circuit 230 is formed with another configuration, too, the frequency dependences are similarly observed in the magnitudes of the currents Iinv, Is.

Figure 6:
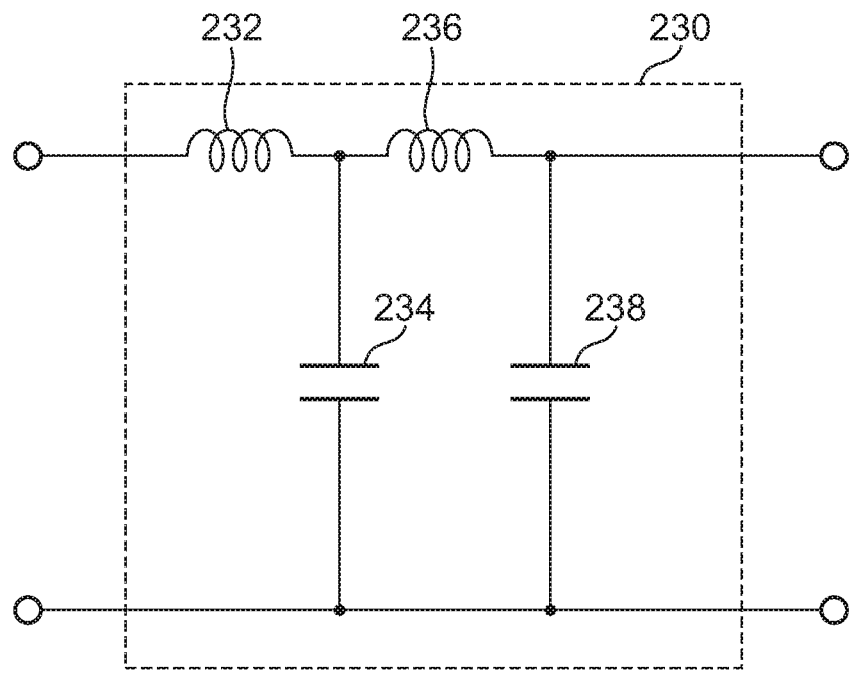
FIG. 6 is a view showing another configuration example of the filter circuit.

FIG. 6 shows another configuration example of the filter circuit 230. Referring to FIG. 6, the filter circuit 230 further includes a capacitor 238, in the circuit configuration shown in FIG. 4. The capacitor 238 is connected between a pair of power lines on one side of the coil 236 closer to the power transmission unit 240 (not shown). Namely, the filter circuit 230 is an L-C-L-C type fourth-order LC filter.

Figure 7:
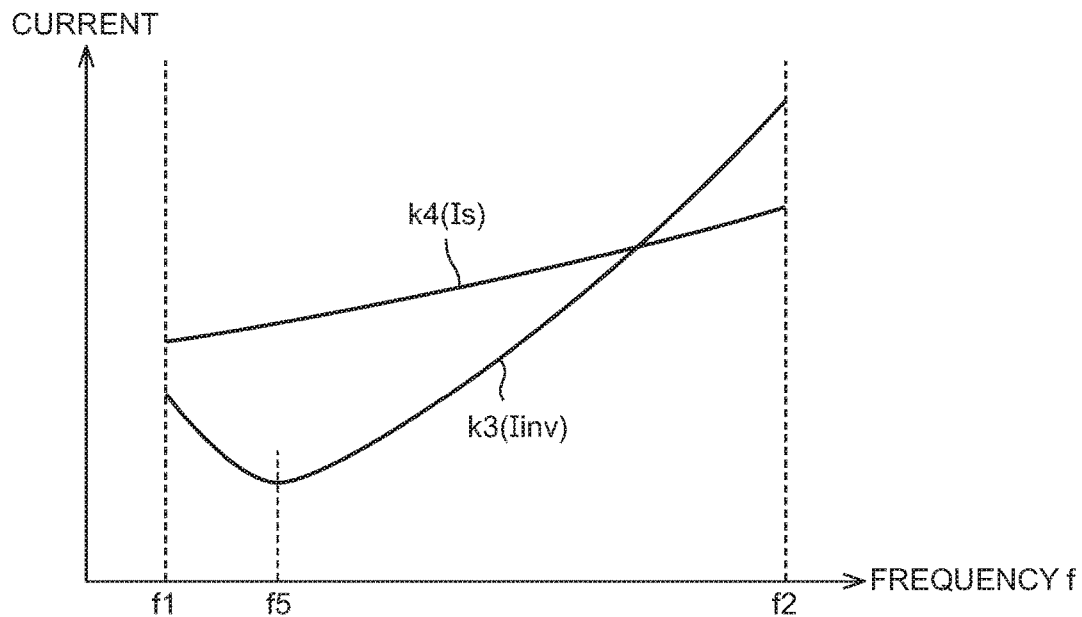
FIG. 7 is a view indicating the frequency dependencies of current of an inverter and current of a power transmission unit under a condition that transmission power is constant, when the filter circuit is in the form of a fourth-order LC filter as shown in FIG. 6.

FIG. 7 shows the frequency dependences of the current Iinv of the inverter 220 and the current Is of the power transmission unit 240 under a condition that the transmission power is constant, when the filter circuit 230 is in the form of the fourth-order LC filter shown in FIG. 6. Referring to FIG. 7, under the condition that the transmission power is constant, line k3 indicates the frequency dependence of the magnitude of the current Iinv of the inverter 220, and line k4 indicates the frequency dependence of the magnitude of the current Is flowing through the resonance circuit of the power transmission unit 240. As shown in FIG. 7, in this example, the current Iinv varies along a curve that is convex downward as the frequency changes, and the current Is monotonously increases as the frequency f increases. The frequency f5 is a frequency at which the magnitude of the current Iinv is smallest in the adjustable range of the frequency f.

It is understood from the frequency dependences of the magnitudes of the currents Iinv, Is that the magnitude of the current Iinv can be reduced, or the magnitude of the current Is can be reduced, by adjusting the frequency f of the transmission power. For example, when the temperature Tinv of the inverter 220 is higher than the temperature Ts of the resonance circuit of the power transmission unit 240, in the case where the frequency f is controlled to the frequency F2, the magnitude of the current Iinv of the inverter 220 can be reduced, without reducing the transmission power, by adjusting the frequency f to the frequency f5, for example. As a result, the temperature Tinv of the inverter 220 can be lowered.

The relationship between the current Iinv and temperature Tinv of the inverter 220 will be explained. The temperature Tinv of the inverter 220 can be reduced by reducing the loss of the inverter 220. The loss of the inverter 220 depends on not only the magnitude of the current Iinv of the inverter 220, but also the frequency f (switching frequency of the inverter 220) of the transmission power.

The loss of the inverter 220 consists of conduction losses and switching losses of the switching devices. The conduction losses are determined by the magnitude of the current Iinv of the inverter 220. On the other hand, the switching losses consist of ON losses and OFF losses of the switching devices, which depend on the switching frequency of the inverter 220. Thus, there is a need to look at the relationship between the current Iinv of the inverter 220 and the loss (conduction losses+switching losses) of the inverter 220, in view of the frequency dependence of the loss of the inverter 220.

Figure 8:
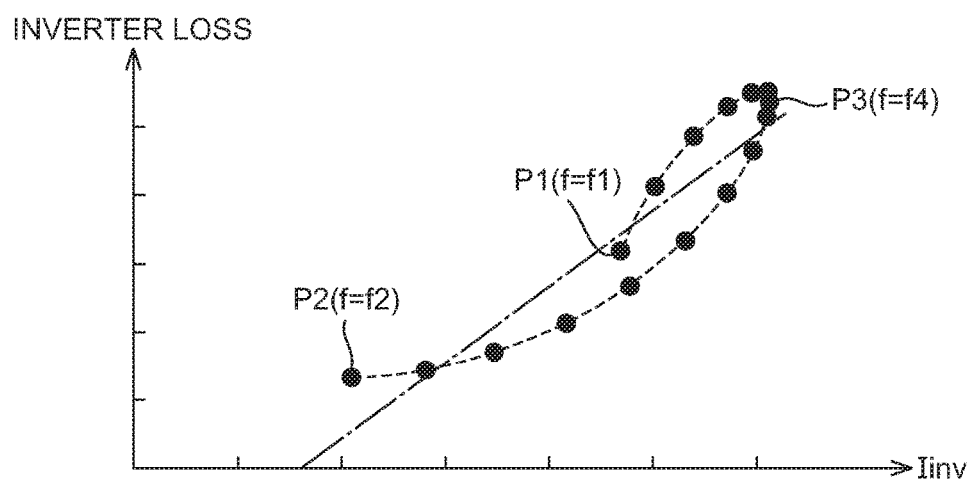
FIG. 8 is a view indicating the relationship between the current of the inverter and a loss of the inverter, in an adjustable range of the frequency of transmission power.

FIG. 8 shows the relationship between the current Iinv of the inverter 220 and the loss of the inverter 220, in the adjustable range of the frequency f of the transmission power. FIG. 8 shows a typical example of the above relationship, for the case (FIGS. 4, 5) where the filter circuit 230 is in the form of the third-order LC filter.

Referring to FIG. 8 along with FIG. 5, the horizontal axis indicates the current Iinv of the inverter 220, and the vertical axis indicates the loss of the inverter 220. In FIG. 8, point P1 indicates the current Iinv and the inverter loss when the frequency f of the transmission power is f1 (the lower limit of the adjustable range). Point P3 indicates the current Iinv and the inverter loss when the frequency f is f4 (at which the current Iinv is largest in the adjustable range). Point P2 indicates the current Iinv and the inverter loss when the frequency f is f2 (the upper limit of the adjustable range).

As is understood from the drawings, in the adjustable range of the frequency f, the loss of the inverter 220 can be reduced by reducing the current Iinv of the inverter 220. Accordingly, it is possible to lower the temperature Tinv of the inverter 220, by reducing the current Iinv of the inverter 220, no matter whether the frequency f increases or decreases.

Thus, in the power transmission device 10 according to the first embodiment, when uneven distribution of heat generated appears between the inverter 220 and the resonance circuit of the power transmission unit 240, and there arises a temperature difference between the inverter 220 and the resonance circuit in the power transmission assembly, the power-supply ECU 250 performs frequency adjustment control for adjusting the frequency f (switching frequency of the inverter 220) of transmission power, so as to reduce current that flows through one of the inverter 220 and the resonance circuit which has the higher temperature.

More specifically, the above-mentioned frequency adjustment control includes first control for adjusting the frequency f so as to reduce the current Iinv of the inverter 220, when the temperature Tinv of the inverter 220 is higher than the temperature Ts of the resonance circuit, and second control for adjusting the frequency f so as to reduce the current Is flowing through the resonance circuit, when the temperature Ts is higher than the temperature Tinv. When the temperature Tinv is higher than the temperature Ts, the current Iinv is reduced under the first control, so that the temperature Tinv is lowered. On the other hand, when the temperature Ts is higher than the temperature Tinv, the current Is is reduced under the second control, so that the temperature Ts is lowered. Thus, heat is less likely or unlikely to be unevenly generated by a greater amount in one of the resonance circuit and the inverter 220. As a result, the transmission power can be prevented from being limited due to temperature restrictions, which would be imposed when the temperature of one of the resonance circuit and the inverter 220 increases.

While the current Iinv of the inverter 220 and the current Is flowing through the resonance circuit exhibit frequency dependencies as shown in FIG. 5 and FIG. 7 under the condition that the transmission power is constant, the frequency characteristics of the currents Iinv, Is change according to the temperature of each circuit and the parasitic capacitance at the time of actual installation of the system, for example. Therefore, it is difficult to grasp in advance the frequency characteristics of current as shown in FIG. 5 and FIG. 7 (i.e., prepare them as design values), and perform frequency adjustment. Namely, it is difficult to prepare in advance the frequency f (e.g., frequency f3 or f2 in FIG. 5) at which the current Iinv or current Is can be reduced, and then perform frequency adjustment. Thus, in the power transmission device 10 according to the first embodiment, the frequency f is varied within the adjustable range of the frequency f, and the frequency f is adjusted so as to reduce the current Iinv or the current Is, as will be described later.

Figure 9:
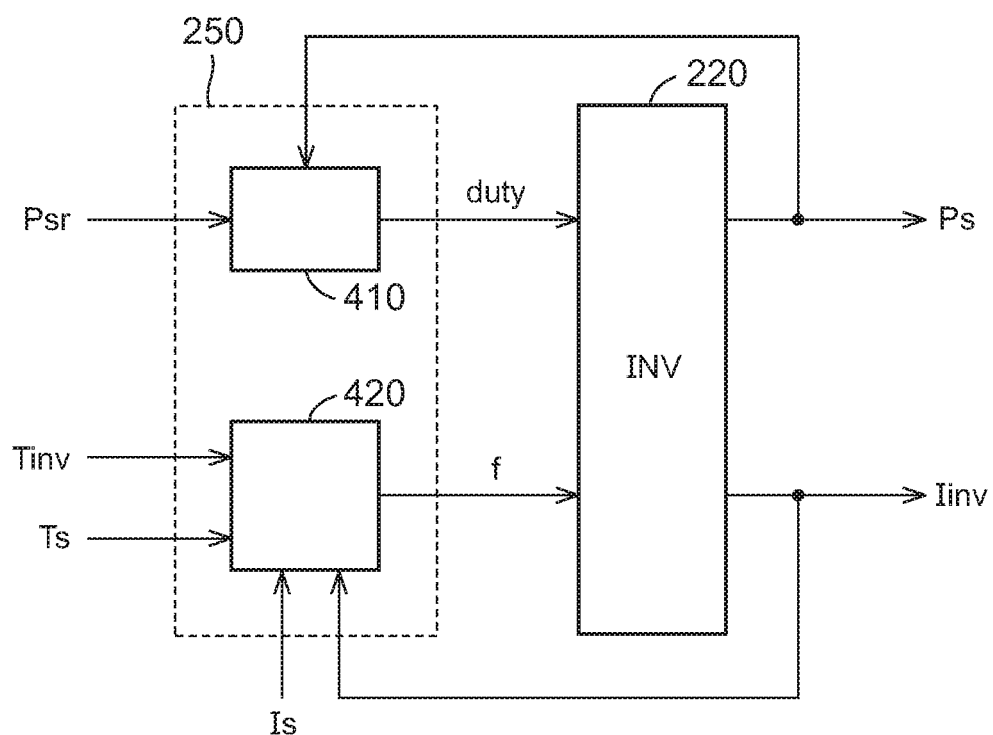
FIG. 9 is a control block diagram of control performed by a power-supply ECU shown in FIG. 1.

FIG. 9 is a control block diagram of control performed by the power-supply ECU 250 shown in FIG. 1. Referring to FIG. 9, the power-supply ECU 250 includes a controller 410 that implements transmission power control, and a controller 420 that performs temperature difference reduction control.

The controller 410 receives a target power Psr that indicates a target value of transmission power Ps, and a detected value of the transmission power Ps. For example, the target power Psr can be produced based on power receiving conditions of the power receiving device 20. In the first embodiment, in the power receiving device 20, the target power Psr of the transmission power Ps is produced based on a difference between a target value and a detected value of received power, and is transmitted from the power receiving device 20 to the power transmission device 10. For example, the transmission power Ps can be calculated based on detected values of the voltage sensor 270 and the current sensor 272 (FIG. 1).

Then, the controller 410 produces a duty command value of the output voltage of the inverter 220, based on a difference between the target power Psr and the transmission power Ps. The duty of the output voltage of the inverter 220 is defined as the ratio of positive (or negative) voltage output time to the period of output voltage waveform (rectangular wave). The duty of the inverter output voltage can be adjusted, by changing the operating timing of the switching devices (the ratio of ON period to OFF period: 0.5) of the inverter 220. For example, the controller 410 calculates an operation amount by performing PI control (proportional-integral control) using the difference between the target power Psr and the transmission power Ps as an input, and sets the operation amount thus calculated, as the duty command value. In this manner, the duty of the output voltage is adjusted so as to make the transmission power Ps closer to the target power Psr, and the transmission power Ps is controlled to the target power Psr.

The controller 420 receives a detected value of the temperature Tinv of the inverter 220 from the temperature sensor 276 (FIGS. 1, 3), and receives a detected value of the temperature Ts of the resonance circuit of the power transmission unit 240 from the temperature sensor 278 (FIGS. 1, 3). Then, when the temperature Tinv is higher than the temperature Ts, the controller 420 adjusts the frequency f of the transmission power so as to reduce the current Iinv of the inverter 220. On the other hand, when the temperature Ts of the resonance circuit of the power transmission unit 240 is higher than the temperature Tinv of the inverter 220, the controller 420 adjusts the frequency f so as to reduce the current Is flowing through the resonance circuit. In this manner, uneven distribution of generated heat between the inverter 220 and the resonance circuit is curbed, and the temperature difference between the inverter 220 and the resonance circuit is reduced. A specific method of adjusting the frequency f will be described in detail later.

Figure 10:
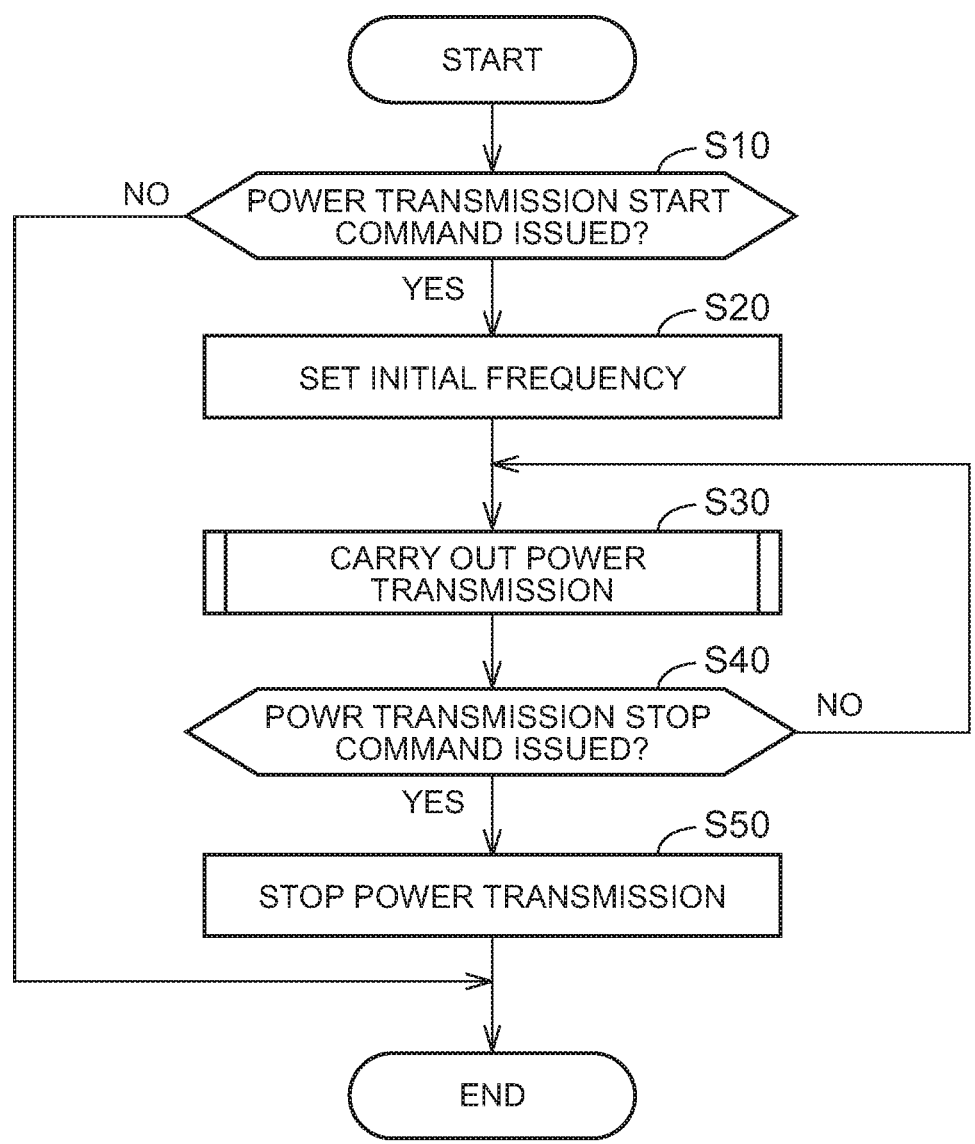
FIG. 10 is a flowchart illustrating an electric power transmission routine performed by the power-supply ECU.

FIG. 10 is a flowchart illustrating an electric power transmission routine performed by the power-supply ECU 250. A series of tasks shown in the flowchart of FIG. 10 is started when there is a start command for electric power transmission from the power transmission device 10 to the power receiving device 20. Namely, referring to FIG. 10, when there is a start command for electric power transmission from the power transmission device 10 to the power receiving device 20 (YES in step S10), the power-supply ECU 250 sets the initial value of the frequency f of transmission power (step S20).

The start command for electric power transmission from the power transmission device 10 to the power receiving device 20 may be generated based on a command given by the user in the power transmission device 10 or the power receiving device 20, or may be generated when the charge start time set by a timer, or the like, comes.

For example, the frequency (design value) at which the efficiency of electric power transfer between the power transmission unit 240 and the power receiving unit 310 is maximized is set as the initial value of the frequency f of transmission power. The frequency f1 as the lower limit of the adjustable range of the frequency f or the frequency f2 as the upper limit of the adjustable range may also be set as the initial value of the frequency f.

Once the initial value of the frequency f is set, the power-supply ECU 250 controls the inverter 220, to carry out electric power transmission from the power transmission device 10 to the power receiving device 20 (step S30). More specifically, the power-supply ECU 250 adjusts the duty of the output voltage of the inverter 220, so as to perform transmission power control for making the transmission power equal to the target power. Also, the power-supply ECU 250 controls the switching frequency of the inverter 220 to adjust the frequency f of the transmission power, so as to perform temperature difference reduction control for reducing a temperature difference between the inverter 220 and the resonance circuit of the power transmission unit 240. The procedure of the temperature difference reduction control will be described in detail later.

Then, if there is a stop command for stopping electric power transmission from the power transmission device 10 to the power receiving device 20 (YES in step S40), the power-supply ECU 250 stops the inverter 220, and stops power transmission from the power transmission device 10 to the power receiving device 20 (step S50). The command for stopping power transmission from the power transmission device 10 to the power receiving device 20 may be generated based on a notification from the power receiving device 20 that the power storage device 350 (FIG. 1) is placed in a fully charged state, or based on a command generated by the user in the power transmission device 10 or the power receiving device 20.

Figure 11:
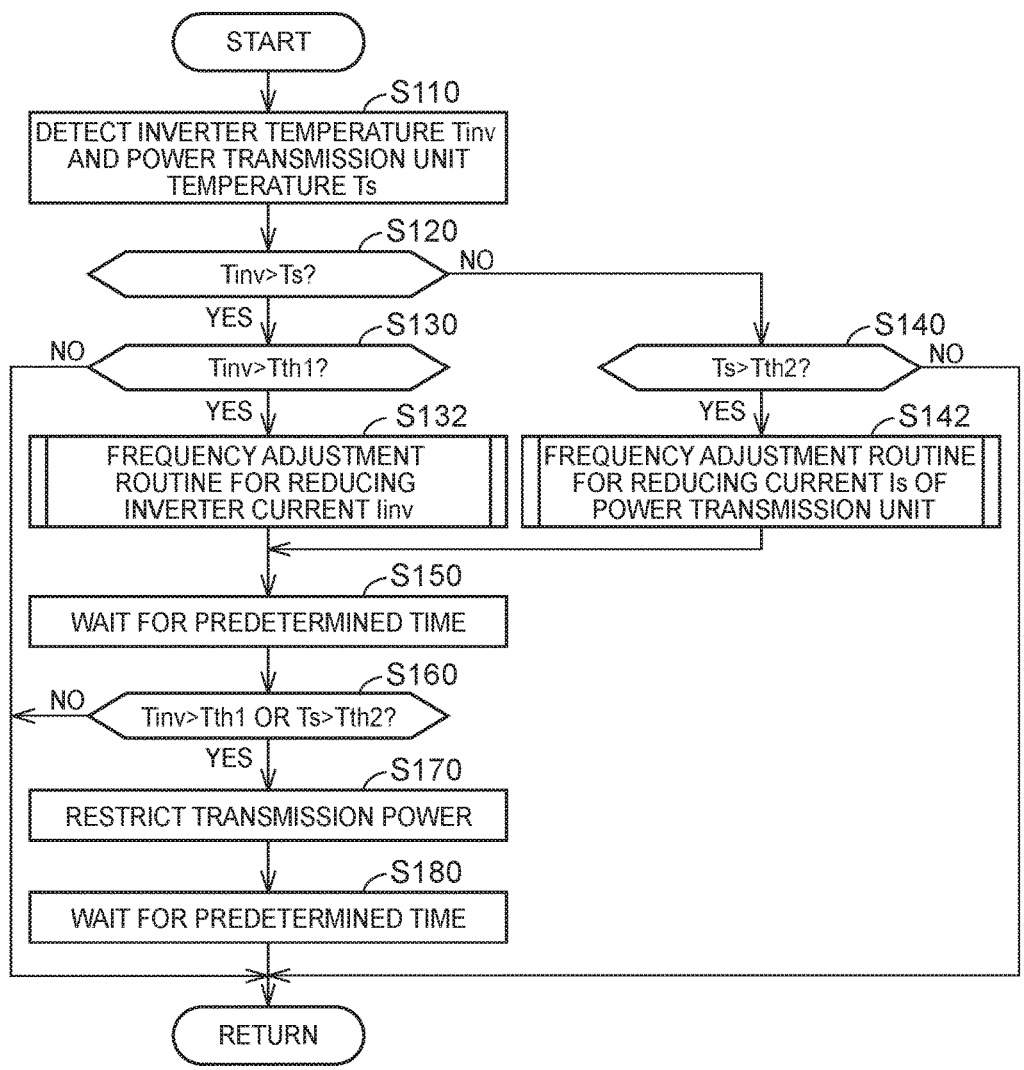
FIG. 11 is a flowchart illustrating the procedure of temperature difference reduction control performed in step S30 of FIG. 10.

FIG. 11 is a flowchart illustrating the procedure of the temperature difference reduction control performed in step S30 of FIG. 10. A series of tasks indicated in the flowchart (of FIG. 11) is repeatedly executed at given time intervals, during execution of step S30 of FIG. 10.

Referring to FIG. 11, the power-supply ECU 250 detects the temperature Tinv of the inverter 220 by means of the temperature sensor 276, and detects the temperature Ts of the resonance circuit of the power transmission unit 240 by means of the temperature sensor 278 (step S110). Then, the power-supply ECU 250 determines whether the temperature Tinv of the inverter 220 is higher than the temperature Ts of the resonance circuit (step S120).

If it is determined that the temperature Tinv is higher than the temperature Ts (YES in step S120), the power-supply ECU 250 determines whether the temperature Tinv is higher than a threshold temperature Tth1 (step S130). For example, the threshold temperature Tth1 is set to a temperature having an appropriate margin relative to the upper limit of the temperature of the inverter 220. When the temperature Tinv is equal to or lower than the threshold temperature Tth1 (NO in step S130), the power-supply ECU 250 proceeds to "RETURN" without executing subsequent steps.

If it is determined in step S130 that the temperature Tinv is higher than the threshold temperature Tth1 (YES in step S130), the power-supply ECU 250 performs a frequency adjustment routine for reducing the current Iinv of the inverter 220, so as to lower the temperature Tinv (step S132). Namely, the power-supply ECU 250 adjusts the frequency f of transmission power by controlling the switching frequency of the inverter 220, so as to reduce the current Iinv.

Figure 12:
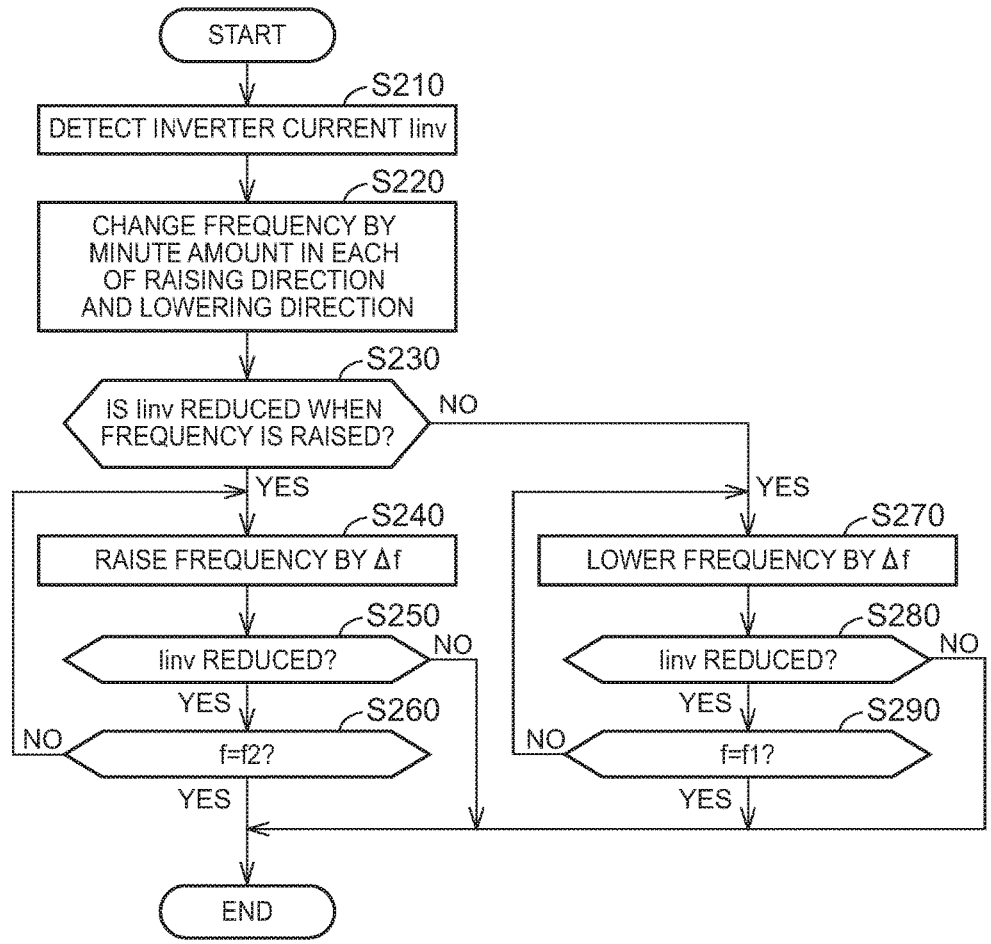
FIG. 12 is a flowchart illustrating the procedure of a frequency adjustment routine executed in step S132 of FIG. 11.

FIG. 12 is a flowchart illustrating the procedure of the frequency adjustment routine executed in step S132 of FIG. 11. Referring to FIG. 12, the power-supply ECU 250 detects the current Iinv of the inverter 220 by means of the current sensor 272 (step S210). Then, the power-supply ECU 250 controls the switching frequency of the inverter 220, so as to change the frequency f of transmission power by a minute amount in each of a direction to raise the frequency f and a direction to lower the frequency f (step S220).

Subsequently, the power-supply ECU 250 determines whether the current Iinv is reduced when the frequency f is raised in step S220 (step S230). If it is determined that the current Iinv is reduced when the frequency f is raised (YES in step S230), the direction to raise the frequency f is determined as the direction to adjust the frequency f, and the power-supply ECU 250 raises the frequency f by a given amount Δf (step S240).

Then, the power-supply ECU 250 determines whether the current Iinv is reduced, by raising the frequency f by the given amount Δf in step S240 (step S250). If the current Iinv is reduced (YES in step S250), the power-supply ECU 250 determines whether the frequency f has reached the frequency f2 that is the upper limit of the adjustable range (step S260). If the frequency f has not reached the frequency f2 (NO in step S260), the power-supply ECU 250 returns to step S240, in which the frequency f is raised by the given amount Δf again.

If the current Iinv is not reduced in step S250 (NO in step S250), it is determined that the current Iinv is smallest at the current frequency f, and the routine ends. If it is determined in step S260 that the frequency f has reached the frequency f2 that is the upper limit of the adjustable range (YES in step S260), too, the routine ends. In this case, the current Iinv is not necessarily smallest, and there remains a possibility that the current Iinv is minimized at the frequency f1, for example.

On the other hand, when it is determined in step S230 that the current Iinv is not reduced when the frequency f is raised in step S220, namely, that the current Iinv is reduced when the frequency f is lowered in step S220 (NO in step S230), the direction to lower the frequency f is determined as the direction to adjust the frequency f, and the power-supply ECU 250 lowers the frequency f by a given amount Δf (step S270).

Then, the power-supply ECU 250 determines whether the current Iinv is reduced, by reducing the frequency f by the given amount Δf in step S270 (step S280). If the current Iinv is reduced (YES in step S280), the power-supply ECU 250 determines whether the frequency f has reached the frequency f1 that is the lower limit of the adjustable range (step S290). If the frequency f has not reached the frequency f1 (NO in step S290), the power-supply ECU 250 returns to step S270, in which the frequency f is lowered by the given amount Δf again.

If the current Iinv is not reduced in step S280 (NO in step S280), it is determined that the current Iinv is smallest at the current frequency f, and the routine ends. Also, if it is determined in step S290 that the frequency f has reached the frequency f1 that is the lower limit of the adjustable range (YES in step S290), the routine ends. In this case, too, the current Iinv is not necessarily smallest, and there remains a possibility that the current Iinv is minimized at the frequency f2, for example.

Referring again to FIG. 11, if the frequency adjustment routine for reducing the current Iinv of the inverter 220 is performed in step S132, the power-supply ECU 250 waits for a predetermined time (step S150). The predetermined time is a length of time it takes until the influence of the frequency adjustment routine is reflected by the temperature of the inverter 220 or the power transmission unit 240, and is determined as appropriate according to the configuration of the inverter 220 or the power transmission unit 240.

On the other hand, if it is determined in step S120 that the temperature Ts of the resonance circuit of the power transmission unit 240 is equal to or higher than the temperature Tinv of the inverter 220 (NO in step S120), the power-supply ECU 250 determines whether the temperature Ts is higher than a threshold temperature Tth2 (step S140). For example, the threshold temperature Tth2 is set to a temperature having an appropriate margin relative to the upper limit of the temperature of the resonance circuit of the power transmission unit 240. When the temperature Ts is equal to or lower than the threshold temperature Tth2 (NO in step S140), the power-supply ECU 250 proceeds to "RETURN" without executing subsequent steps.

If it is determined in step S140 that the temperature Ts is higher than the threshold temperature Tth2 (YES in step S140), the power-supply ECU 250 performs a frequency adjustment routine for reducing the current Is flowing through the resonance circuit of the power transmission unit 240, so as to lower the temperature Ts (step S142). Namely, the power-supply ECU 250 adjusts the frequency f of transmission power by controlling the switching frequency of the inverter 220, so as to reduce the current Is.

Figure 13:
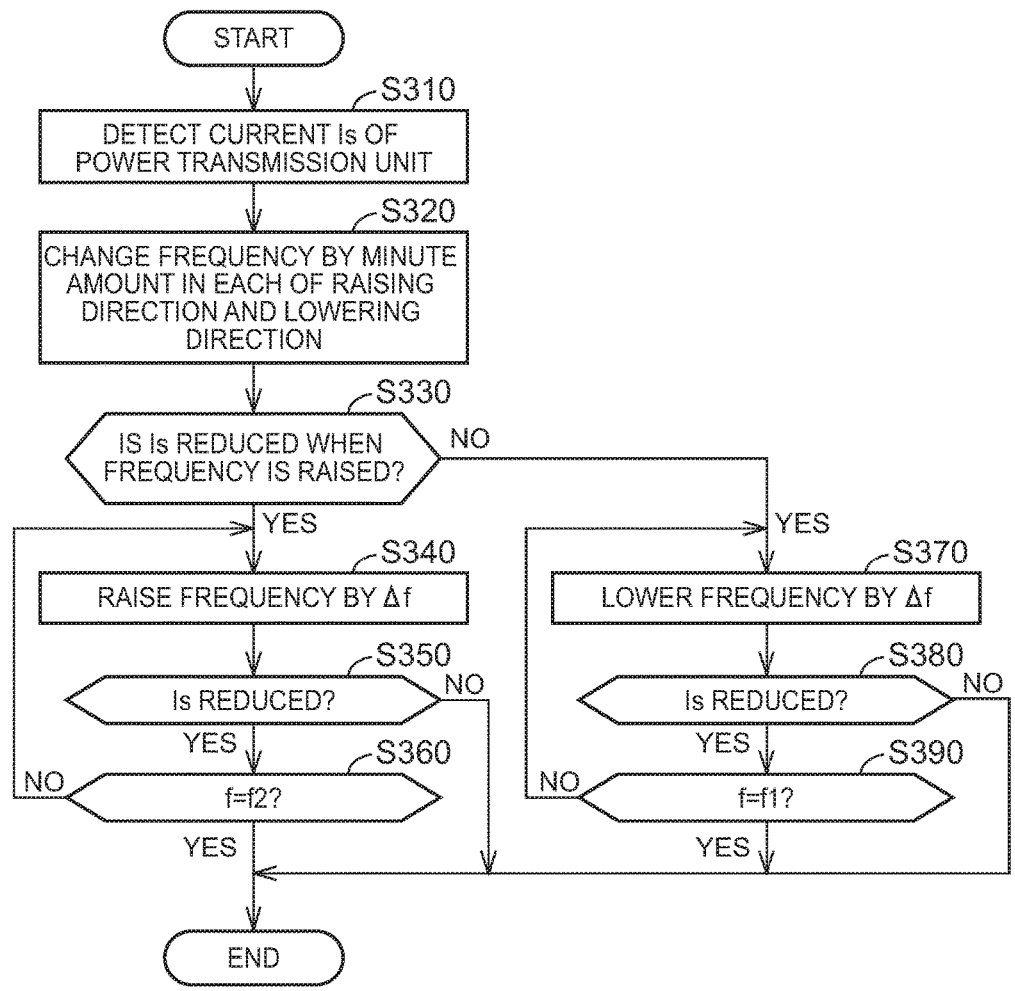
FIG. 13 is a flowchart illustrating the procedure of a frequency adjustment routine executed in step S142 of FIG. 11.

FIG. 13 is a flowchart illustrating the procedure of the frequency adjustment routine executed in step S142 of FIG. 11. Referring to FIG. 13, the power-supply ECU 250 detects the current Is flowing through the resonance circuit of the power transmission unit 240 by means of the current sensor 274 (step S310). Then, the power-supply ECU 250 controls the switching frequency of the inverter 220, so as to change the frequency f of transmission power by a minute amount in each of the direction to raise the frequency f and the direction to lower the frequency f (step S320).

Subsequently, the power-supply ECU 250 determines whether the current Is is reduced when the frequency f is raised (step S330). If it is determined that the current Is is reduced when the frequency f is raised (YES in step S330), the direction to raise the frequency f is determined as the direction to adjust the frequency f, and the power-supply ECU 250 raises the frequency f by a given amount Δf (step S340).

Then, the power-supply ECU 250 determines whether the current Is is reduced, by raising the frequency f by the given amount Δf in step S340 (step S350). When the current Is is reduced (YES in step S350), the power-supply ECU 250 determines whether the frequency f has reached the frequency f2 that is the upper limit of the adjustable range (step S360). If the frequency f has not reached the frequency f2 (NO in step S360), the power-supply ECU 250 returns to step S340, in which the frequency f is raised by the given amount Δf again.

If the current Is is not reduced in step S350 (NO in step S350), it is determined that the current Is is smallest at the current frequency f, and the routine ends. If it is determined in step S360 that the frequency f has reached the frequency f2 that is the upper limit of the adjustable range (YES in step S360), too, the routine ends. In this case, the current Is is not necessarily smallest, and there remains a possibility that the current Is is minimized at the frequency f1, for example.

On the other hand, if it is determined in step S330 that the current Is is not reduced when the frequency f is raised, namely, that the current Is is reduced when the frequency f is lowered (NO in step S330), the direction to lower the frequency f is determined as the direction to adjust the frequency f, and the power-supply ECU 250 lowers the frequency f by a given amount Δf (step S370).

Then, the power-supply ECU 250 determines whether the current Is is reduced, by lowering the frequency f by the given amount Δf in step S370 (step S380). If the current Is is reduced (YES in step 380), the power-supply ECU 250 determines whether the frequency f has reached the frequency f1 that is the lower limit of the adjustable range (step S390). If the frequency f has not reached the frequency f1 (NO in step S390), the power-supply ECU 250 returns to step S370, in which the frequency f is lowered by the given amount Δf again.

If the current Is is not reduced in step S380 (NO in step S380), it is determined that the current Is is smallest at the current frequency f, and the routine ends. Also, if it is determined in step S390 that the frequency f has reached the frequency f1 that is the lower limit of the adjustable range (YES in step S390), the routine ends. In this case, too, the current Is is not necessarily smallest, and there remains a possibility that the current Is is minimized at the frequency f2, for example.

Referring again to FIG. 11, if the frequency adjustment routine for reducing the current Is flowing through the resonance circuit of the power transmission unit 240 is performed in step S142, the power-supply ECU 250 proceeds to step S150, and waits for a predetermined time.

After waiting for the predetermined time in step S150, the power-supply ECU 250 determines whether the temperature Tinv of the inverter 220 is higher than the threshold temperature Tth1, or the temperature Ts of the resonance circuit is higher than the threshold temperature Tth2 (step S160). If the temperature Tinv is higher than the threshold temperature Tth1, or the temperature Ts is higher than the threshold temperature Tth2 (YES in step S160), the power-supply ECU 250 restricts the transmission power (step S170), since the temperature of the inverter 22 or the resonance circuit of the power transmission unit 240 cannot be reduced to be equal to or lower than the threshold temperature, even through the frequency adjustment routine in step S132 or step S142. For example, the power-supply ECU 250 can restrict the transmission power, by forcedly reducing the target power Psr of the transmission power at this time.

Then, after waiting for a predetermined time (step S180), the power-supply ECU 250 proceeds to "RETURN". The predetermined time is a length of time it takes until the influence of restriction of the transmission power is reflected by the temperature of the inverter 220 or the power transmission unit 240, and is determined as appropriate according to the configuration of the inverter 220 or the power transmission unit 240.

As described above, in the first embodiment, when the temperature Tinv of the inverter 220 is higher than the temperature Ts of the resonance circuit, the temperature Tinv is lowered by adjusting the frequency f of the transmission power so as to reduce the current Iinv of the inverter 220. On the other hand, when the temperature Ts is higher than the temperature Tinv, the temperature Ts is lowered by adjusting the frequency f so as to reduce the current Is flowing through the resonance circuit. Thus, according to the first embodiment, heat is less likely or unlikely to be unevenly generated by a greater amount in one of the resonance circuit of the power transmission unit 240 and the inverter 220. As a result, the transmission power can be prevented from being limited due to temperature restrictions, which would be imposed when the temperature of one of the resonance circuit and the inverter 220 increases.

A second embodiment is different from the first embodiment in terms of the frequency adjustment routine for reducing the current Iinv of the inverter 220 or the current Is flowing through the resonance circuit of the power transmission unit 240. In the first embodiment as described above, in the frequency adjustment routine in step S132 of FIG. 11, the frequency f may not be necessarily adjusted to the frequency at which the current Iinv is minimized. Similarly, in the frequency adjustment routine in step 142 of FIG. 11, the frequency f may not be necessarily adjusted to the frequency at which the current Is is minimized.

In the second embodiment, in the adjustable range of the frequency f, the frequency f is adjusted so that the current flowing through the device having the higher temperature is minimized. As a result, heat generated in one of the resonance circuit and the inverter 220 which has the higher temperature is promptly suppressed or reduced, and uneven distribution of generated heat between the resonance circuit and the inverter 220 is promptly curbed.

The overall configuration of an electric power transfer system according to the second embodiment is identical with that of the first embodiment shown in FIG. 1. Also, the configuration of a power transmission assembly in the second embodiment is identical with that of the first embodiment shown in FIG. 3. The second embodiment is different from the first embodiment in the procedure of the frequency adjustment routine executed in step S132, S142, in the flowchart illustrating the procedure of the temperature difference reduction control shown in FIG. 11.

Figure 14:
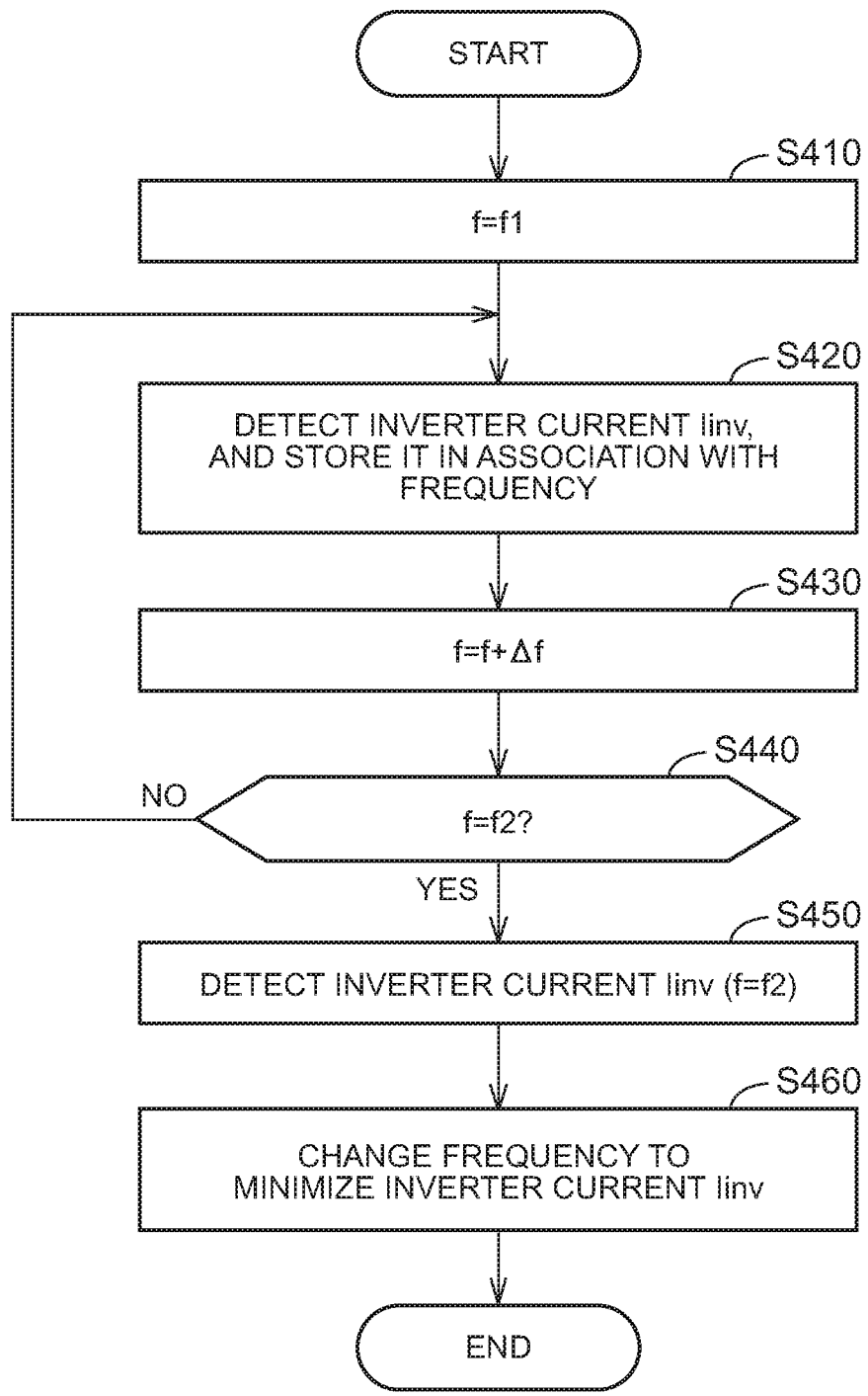
FIG. 14 is a flowchart illustrating the procedure of a frequency adjustment routine executed in step S132 of FIG. 11, in a second embodiment.

FIG. 14 is a flowchart illustrating the procedure of the frequency adjustment routine executed in step S132 of FIG. 11, in the second embodiment. Referring to FIG. 14, the power-supply ECU 250 initially sets the frequency f of transmission power to the frequency f1 that is the lower limit of the adjustable range (step S410).

Then, the power-supply ECU 250 detects the current Iinv of the inverter 220 by means of the current sensor 272, and stores the detected current Iinv in association with the current frequency f (step S420). Subsequently, the power-supply ECU 250 raises the frequency f by a given amount Δf (step S430). Then, the power-supply ECU 250 determines whether the frequency f has reached the frequency f2 that is the upper limit of the adjustable range (step S440). If the frequency f has not reached the frequency f2 (NO in step S440), the power-supply ECU 250 returns to step S420, in which the current Iinv of the inverter 220 is detected by the current sensor 272 again, and is stored in association with the current frequency f.

If it is determined in step S440 that the frequency f has reached the upper-limit frequency f2 (YES in step S440), the power-supply ECU 250 detects the current Iinv of the inverter 220 by means of the current sensor 272, and associates it with the frequency f2 (step S450). In this manner, the current Iinv for each frequency when the frequency f is continuously varied in the adjustable range (f1≤f≤f2) of the frequency f is obtained. Then, the power-supply ECU 250 changes the frequency f to a frequency at which the current Iinv of the inverter 22 is smallest in the adjustable range of the frequency f (step S460).

According to the frequency adjustment routine shown in FIG. 14, the frequency f is adjusted to the frequency at which the current Iinv is minimized; therefore, heat generated by the inverter 220 is promptly suppressed or reduced, and uneven distribution of generated heat between the resonance circuit and the inverter 220 is promptly curbed.

Figure 15:
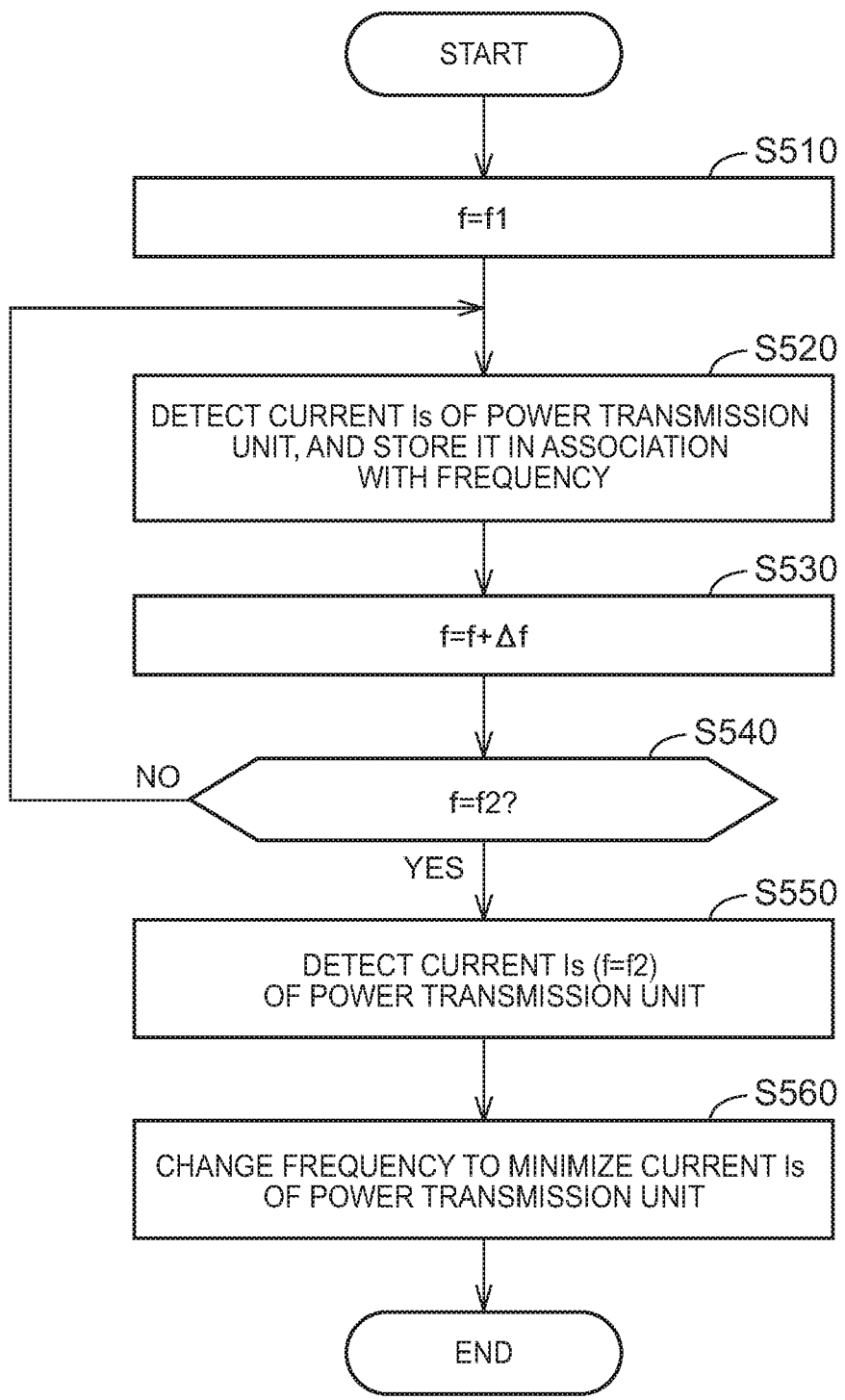
FIG. 15 is a flowchart illustrating the procedure of a frequency adjustment routine executed in step S142 of FIG. 11, in the second embodiment.

FIG. 15 is a flowchart illustrating the procedure of the frequency adjustment routine executed in step S142 of FIG. 11, in the second embodiment. Referring to FIG. 15, the power-supply ECU 250 initially sets the frequency f of transmission power to the frequency f1 that is the lower limit of the adjustable range (step S510).

Then, the power-supply ECU 250 detects the current Is of the resonance circuit of the power transmission unit 240 by means of the current sensor 274, and stores it in association with the current frequency f (step S520). Subsequently, the power-supply ECU 250 raises the frequency f by a given amount Δf (step S530). Then, the power-supply ECU 250 determines whether the frequency f has reached the frequency f2 that is the upper limit of the adjustable range (step S540). If the frequency f has not reached the frequency f2 (NO in step S540), the power-supply ECU 250 returns to step S520, in which the current Is is detected by the current sensor 274 again, and is stored in association with the current frequency f If it is determined in step S540 that the frequency f has reached the upper-limit frequency f2 (YES in step S540), the power-supply ECU 250 detects the current Is by means of the current sensor 274, and associates it with the frequency f2 (step S550). In this manner, the current Is for each frequency when the frequency f is continuously varied in the adjustable range (f1≤f≤f2) of the frequency f is obtained. Then, the power-supply ECU 250 changes the frequency f to a frequency at which the current Is is smallest in the adjustable range of the frequency f (step S560).

According to the frequency adjustment routine shown in FIG. 15, the frequency f is adjusted to the frequency at which the current Is is minimized; therefore, heat generated in the resonance circuit of the power transmission unit 240 is promptly suppressed or reduced, and uneven distribution of generated heat between the resonance circuit and the inverter 220 is promptly curbed.

In the embodiment as described above, when the frequency f is continuously varied in the adjustable range of the frequency f, the frequency f is continuously varied from the lower limit f1 of the adjustable range toward the upper limit f2 of the same range. However, the frequency f may be continuously varied from the upper limit f2 of the adjustable range toward the lower range f1 of the same range.

As described above, according to the second embodiment, heat generated in one of the resonance circuit of the power transmission unit 240 and the inverter 220 which has the higher temperature can be promptly reduced, and uneven distribution of generated heat between the resonance circuit and the inverter 220 can be promptly curbed.

In the first and second embodiments, when the temperature Tinv of the inverter 220 is higher than the temperature Ts of the resonance circuit of the power transmission unit 240, and the temperature Tinv is higher than the threshold temperature Tth1, the frequency f of transmission power is adjusted so that the current Iinv of the inverter 220 is reduced. Also, when the temperature Ts is higher than the temperature Tinv, and the temperature Ts is higher than the threshold temperature Tth2, the frequency f of transmission power is adjusted so that the current Is flowing through the resonance circuit of the power transmission unit 240 is reduced.

In a third embodiment, when the temperature Tinv is higher than the temperature Ts, and a difference between the temperature Tinv and the temperature Ts is larger than a threshold value, the frequency f is adjusted so that the current Iinv is reduced. Also, when the temperature Ts is higher than the temperature Tinv, and a difference between the temperature Ts and the temperature Tinv is larger than a threshold value, the frequency f is adjusted so that the current Is is reduced. Thus, the frequency f can be prevented from being adjusted until the temperature difference between the inverter 220 and the resonance circuit of the power transmission unit 240 reaches the threshold value.

The overall configuration of an electric power transfer system according to the third embodiment is identical with that of the first embodiment shown in FIG. 1. Also, the configuration of the power transmission assembly in the third embodiment is also identical with that of the first embodiment shown in FIG. 3. The third embodiment is different from the first and second embodiments in the procedure of the temperature difference reduction control shown in FIG. 11.

Figure 16:
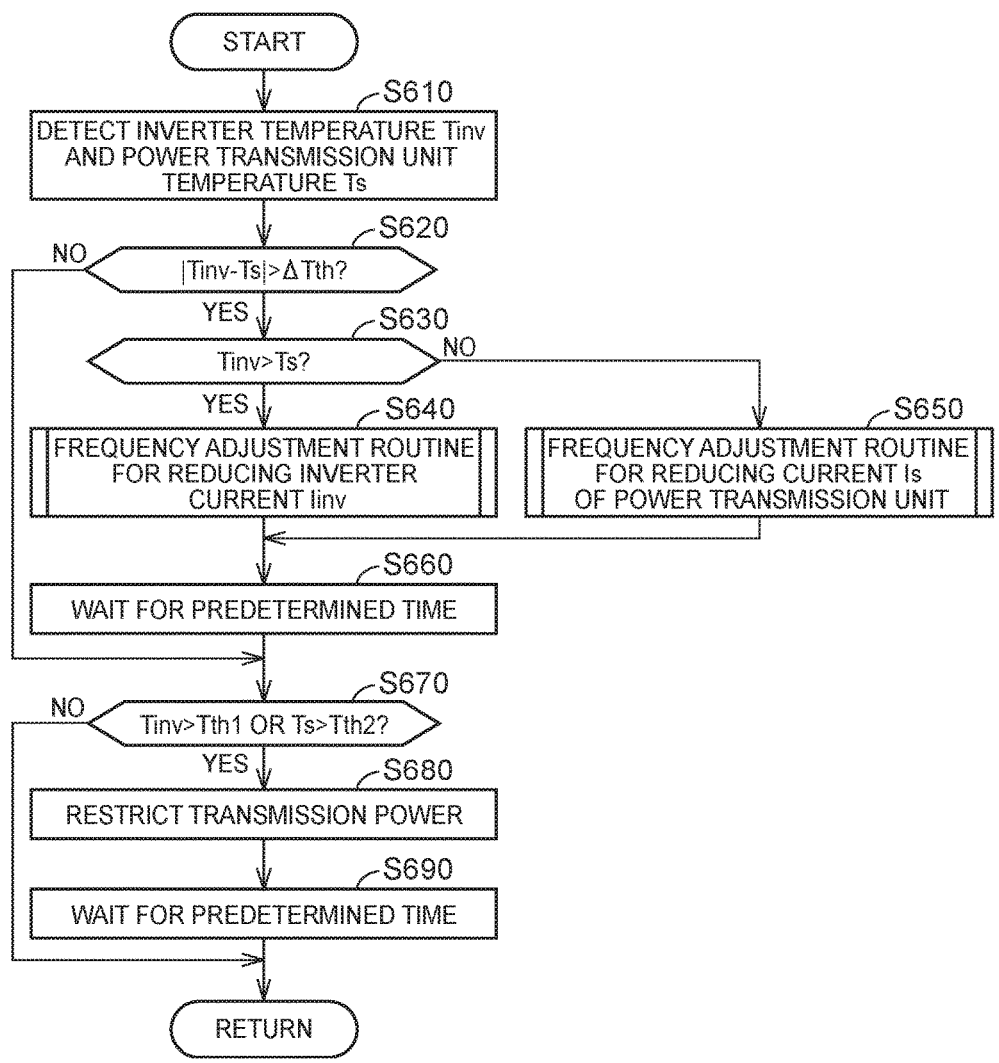
FIG. 16 is a flowchart illustrating the procedure of temperature difference reduction control performed in step S30 of FIG. 10, in a third embodiment.

FIG. 16 is a flowchart illustrating the (processing) procedure of (the) temperature difference reduction control performed in step S30 of FIG. 10. A series of steps shown (indicated) in the flowchart of FIG. 16 is (are) (also) repeatedly executed at given time intervals, during execution of step S30 of FIG. 10.

Referring to FIG. 16, the power-supply ECU 250 detects the temperature Tinv of the inverter 220 by means of the temperature sensor 276, and detects the temperature Ts of the resonance circuit of the power transmission unit 24 by means of the temperature sensor 278 (step S610). Then, the power-supply ECU 250 determines whether an absolute value of a difference between the temperature Tinv and the temperature Ts is larger than a threshold value ΔTth (step S620). The threshold value ΔTth is set to a temperature difference with which temperature restrictions are highly likely to be imposed on the device having the higher temperature, since the temperature difference between the inverter 220 and the resonance circuit of the power transmission unit 240 is large.

If it is determined in step S620 that the absolute value of the difference between the temperature Tinv and the temperature Ts is equal to or smaller than the threshold value ΔTth (NO in step S620), the power-supply ECU 250 proceeds to step S670 (which will be described later). If it is determined in step S620 that the absolute value of the difference between the temperature Tinv and the temperature Ts is larger than the absolute value (YES in step S620), the power-supply ECU 250 determines whether the temperature Tinv is higher than the temperature Ts (step S630).

If it is determined that the temperature Tinv is higher than the temperature Ts (YES in step S630), the power-supply ECU 250 performs the frequency adjustment routine for reducing the current Iinv of the inverter 220 (step S640). As the frequency adjustment routine, the routine shown in FIG. 12 or FIG. 14 may be employed. Then, after the frequency adjustment routine for reducing the current Iinv is performed, the power-supply ECU 250 waits for a predetermined time (step S660).

On the other hand, if it is determined in step S630 that the temperature Ts is equal to or higher than the temperature Tinv (NO in step S630), the power-supply ECU 250 performs the frequency adjustment routine for reducing the current Is flowing through the resonance circuit of the power transmission unit 240 (step S650). As the frequency adjustment routine, the routine shown in FIG. 13 or FIG. 15 may be employed. After the frequency adjustment routine for reducing the current Is is performed, the power-supply ECU 250 proceeds to step S660, and waits for a predetermined time.

After waiting for the predetermined time in step S660, the power-supply ECU 250 determines whether the temperature Tinv of the inverter 220 is higher than a threshold temperature Tth1, or the temperature Ts of the resonance circuit of the power transmission unit 240 is higher than a threshold temperature Tth2 (step S670). If the temperature Tinv is higher than the threshold temperature Tth1, or the temperature Ts is higher than the threshold temperature Tth2 (YES in step S670), the power-supply ECU 250 restricts transmission power (step S680), since the temperature of the inverter 220 or the resonance circuit of the power transmission unit 240 cannot be reduced to be equal to or lower than the threshold temperature, even through the frequency adjustment routine in step S640 or step S650. Then, after waiting for a predetermined time (step S690), the power-supply ECU 250 proceeds to "RETURN".

In the embodiment as described above, the threshold value of the temperature difference between the inverter 220 and the resonance circuit, for the case where the frequency adjustment routine is executed in step S640, and the threshold value of the temperature difference between the resonance circuit and the inverter 220, for the case where the frequency adjustment routine is executed in step S650, are the same value (threshold value ΔTth). However, these threshold values may be different from each other. Namely, when the temperature Tinv of the inverter 220 is higher than the temperature Ts of the resonance circuit, the frequency adjustment routine in step S640 may be executed if the temperature difference between the temperature Tinv and the temperature Ts exceeds a first threshold value. When the temperature Ts is higher than the temperature Tinv, the frequency adjustment routine in step S650 may be executed if the temperature difference between the temperature Ts and the temperature Tinv exceeds a second threshold value.

As described above, in the third embodiment, the frequency f of transmission power is adjusted, as long as the temperature difference between the inverter 220 and the resonance circuit of the power transmission unit 240 is larger than the threshold value. Thus, according to the third embodiment, the frequency f can be prevented from being adjusted until the temperature difference between the inverter 220 and the resonance circuit of the power transmission unit 240 reaches the threshold value.

In the above description, the power-supply ECU 250 corresponds to one example of "controller" according to the present disclosure. Also, the temperature sensor 276 corresponds to one example of "first temperature sensor" according to the present disclosure, and the temperature sensor 278 corresponds to one example of "second temperature sensor" according to the present disclosure.

The embodiments disclosed herein should be considered as being exemplary and not restrictive in all respects. The scope of the present disclosure is indicated or defined by the appended claims, rather than the above description of the embodiments, and is intended to include all changes within the range of the claims and equivalents thereof.

What is claimed is:

1. A contactless electric power transmission device comprising:
   a power transmission assembly including an inverter, a filter circuit, and a resonance circuit, the inverter being configured to produce alternate current power having a given frequency, the resonance circuit being configured to receive the alternate current power from the inverter via the filter circuit, and contactlessly transmit the alternate current power to an electric power receiving device;
   a first temperature sensor configured to detect a temperature of the inverter;
   a second temperature sensor configured to detect a temperature of the resonance circuit; and
   an electronic control unit configured to adjust the frequency of the alternate current power by controlling the inverter, the electronic control unit being configured to perform first control when the temperature of the inverter is higher than the temperature of the resonance circuit, and perform second control when the temperature of the resonance circuit is higher than the temperature of the inverter, the first control including control for adjusting the frequency so as to reduce output current of the inverter, the second control including control for adjusting the frequency so as to reduce current flowing through the resonance circuit.

2. The contactless electric power transmission device according to claim 1, wherein:
   the electronic control unit is configured to perform the first control, when the temperature of the inverter is higher than the temperature of the resonance circuit, and the temperature of the inverter exceeds a first threshold temperature; and
   the electronic control unit is configured to perform the second control, when the temperature of the resonance circuit is higher than the temperature of the inverter, and the temperature of the resonance circuit exceeds a second threshold temperature.

3. The contactless electric power transmission device according to claim 1, wherein: the electronic control unit is configured to perform the first control, when the temperature of the inverter is higher than the temperature of the resonance circuit, and a difference between the temperature of the inverter and the temperature of the resonance circuit is larger than a first threshold value; and
   the electronic control unit is configured to perform the second control, when the temperature of the resonance circuit is higher than the temperature of the inverter, and a difference between the temperature of the resonance circuit and the temperature of the inverter is larger than a second threshold value.

4. The contactless electric power transmission device according to claim 1, wherein:
   the first control includes continuously varying the frequency over an adjustable range of the frequency, and adjusting the frequency to a frequency at which the output current of the inverter is smallest in the adjustable range; and
   the second control includes continuously varying the frequency over the adjustable range of the frequency, and adjusting the frequency to a frequency at which the current flowing through the resonance circuit is smallest in the adjustable range.

5. An electric power transfer system comprising:
   an electric power transmission device; and
   an electric power receiving device configured to contactlessly receive electric power from the electric power transmission device, wherein:
   the electric power transmission device includes a power transmission assembly, a first temperature sensor, a second temperature sensor, and an electronic control unit;

the power transmission assembly includes an inverter, a filter circuit, and a resonance circuit;

the inverter is configured to produce alternate current power having a given frequency;

the resonance circuit is configured to receive the alternate current power from the inverter via the filter circuit, and contactlessly transmit the alternate current power to the electric power receiving device;

the first temperature sensor is configured to detect a temperature of the inverter;

the second temperature sensor is configured to detect a temperature of the resonance circuit;

the electronic control unit is configured to adjust the frequency of the alternate current power by controlling the inverter;

the electronic control unit is configured to perform first control when the temperature of the inverter is higher than the temperature of the resonance circuit, and perform second control when the temperature of the resonance circuit is higher than the temperature of the inverter;

the first control includes control for adjusting the frequency so as to reduce output current of the inverter; and the second control includes control for adjusting the frequency so as to reduce current flowing through the resonance circuit.

\* \* \* \* \*